(12) United States Patent
Abraham et al.

(10) Patent No.: US 12,130,714 B2
(45) Date of Patent: Oct. 29, 2024

(54) FLEXIBLE BYZANTINE FAULT TOLERANCE

(71) Applicant: VMware, Inc., Palo Alto, CA (US)

(72) Inventors: Ittai Abraham, Tel Aviv (IL); Dahlia Malkhi, Palo Alto, CA (US); Kartik Nayak, Chapel Hill, NC (US); Ling Ren, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/472,134

(22) Filed: Sep. 21, 2023

(65) Prior Publication Data

US 2024/0012724 A1     Jan. 11, 2024

Related U.S. Application Data

(63) Continuation of application No. 17/746,066, filed on May 17, 2022, now Pat. No. 11,809,288, which is a
(Continued)

(51) Int. Cl.
*G06F 11/00*     (2006.01)
*G06F 11/14*     (2006.01)
(Continued)

(52) U.S. Cl.
CPC ........ *G06F 11/187* (2013.01); *G06F 11/1425* (2013.01); *G06F 11/182* (2013.01); *G06F 11/2041* (2013.01)

(58) Field of Classification Search
CPC ... G06F 11/187; G06F 11/1425; G06F 11/182
See application file for complete search history.

(56) References Cited

U.S. PATENT DOCUMENTS 11,341,004 B2     5/2022  Abraham et al.
11,809,288 B2 *  11/2023  Abraham ............ G06F 11/2041
(Continued)

OTHER PUBLICATIONS

Dahlia Malkhi, Kartik Nayak, and Ling Ren. Flexible Byzantine Fault Tolerance. arXiv:1904.10067v1 [cs.CR] Apr. 22, 2019, 17 pages.
(Continued)

*Primary Examiner* — Philip Guyton
(74) *Attorney, Agent, or Firm* — King Intellectual Asset Management

(57) ABSTRACT

A method and system for performing a flexible Byzantine fault tolerant (BFT) protocol. The method includes sending, from a client device, a proposed value to a plurality of replica devices and receiving, from at least one of the plurality of replica devices, a safe vote on the proposed value. The replica device sends the safe vote, based on a first quorum being reached, to the client device and each of the other replica devices of the plurality of replica devices. The method further includes determining that a number of received safe votes for the proposed value meets or exceeds a second quorum threshold, selecting the proposed value based on the determination, and setting a period of time within which to receive additional votes. The method further includes, based on the period of time elapsing without receiving the additional votes, committing the selected value for the single view.

20 Claims, 8 Drawing Sheets

Related U.S. Application Data continuation of application No. 17/107,630, filed on Nov. 30, 2020, now Pat. No. 11,341,004.

(60) Provisional application No. 63/014,107, filed on Apr. 22, 2020.

(51) Int. Cl.
    *G06F 11/18*    (2006.01)
    *G06F 11/20*    (2006.01)

(56) References Cited

U.S. PATENT DOCUMENTS

| | | | |
|---|---|---|---|
| 2018/0101560 | A1 | 4/2018 | Christidis et al. |
| 2019/0354518 | A1 | 11/2019 | Zochowski |
| 2019/0377645 | A1 | 12/2019 | Abraham et al. |
| 2022/0276938 | A1 | 9/2022 | Abraham et al. |
| 2024/0012724 | A1* | 1/2024 | Abraham ............ G06F 11/2041 |

OTHER PUBLICATIONS

Dahlia Malkhi, Kartik Nayak, and Ling Ren. Flexible Byzantine Fault Tolerance. arXiv:1904.10067v2 [cs.CR] May 30, 2019, 19 pages.

Ittai Abraham, Srinivas Devadas, Danny Dolev, Kartik Nayak, and Ling Ren. Synchronous byzantine agreement with expected o(1) rounds, expected o(n2) communication, and optimal resilience. In Financial Cryptography and Data Security (FC), 2019, 17 pages.

Ittai Abraham, Danny Dolev, Rica Gonen, and Joe Halpern. Distributed computing meets game theory: robust mechanisms for rational secret sharing and multiparty computation. In Proceedings of the twenty-fifth annual ACM symposium on Principles of distributed computing, pp. 53-62. ACM, 2006, 10 pages.

Ittai Abraham, Dahlia Malkhi, Kartik Nayak, and Ling Ren. Dfinity consensus, explored. Cryptology ePrint Archive, Report 2018/1153,2018, 6 pages.

Ittai Abraham, Dahlia Malkhi, Kartik Nayak, Ling Ren, and Maofan Yin. Sync hotstuff: Synchronous smr with 2 latency and optimistic responsiveness. Cryptology ePrint Archive, Report 2019/270, 2019, 10 pages.

Amitanand S Aiyer, Lorenzo Alvisi, Allen Clement, Mike Dahlin, Jean-Philippe Martin, and Carl Porth. Bar fault tolerance for cooperative services. In ACM SIGOPS operating systems review, vol. 39, pp. 45-48. ACM, 2005, 14 pages.

Ethan Buchman. Tendermint: Byzantine fault tolerance in the age of blockchains. PhD thesis, 2016, 109 pages.

Vitalik Buterin and Virgil Griffith. Casper the friendly finality gadget. CoRR, abs/1710.09437, 2017, 10 pages.

Christian Cachin, Klaus Kursawe, and Victor Shoup. Random oracles in Constantinople: Practical asynchronous byzantine agreement using cryptography. Journal of Cryptology, 18(3):219-246, 2005, 26 pages.

Miquel Castro and Barbara Liskov. Practical byzantine fault tolerance. In OSDI, vol. 99, pp. 173-186, 1999, 14 pages.

Cynthia Dwork, Nancy Lynch, and Larry Stockmeyer. Consensus in the presence of partial synchrony. Journal of the ACM, 35(2):288-323, 1988, 36 pages.

S Dov Gordon and Jonathan Katz. Rational secret sharing, revisited. In International Conference on Security and Cryptography for Networks, pp. 229-241. Springer, 2006, 13 pages.

Guy Golan Gueta, Ittai Abraham, Shelly Grossman, Dahlia Malkhi, Benny Pinkas, Michael K Reiter, Dragos-Adrian Seredinschi, Orr Tamir, and Alin Tomescu. Sbft: a scalable decentralized trust infrastructure for blockchains. arXiv preprint arXiv:1804.01626, 2018, 23 pages.

Timo Hanke, Mahnush Movahedi, and Dominic Williams. Dfinity technology overview series, consensus system. arXiv preprint arXiv:1805.04548, 2018, 16 pages.

Heidi Howard, Dahlia Malkhi, and Alexander Spiegelman. Flexible paxos: Quorum intersection revisted. In OPODIS, vol. 70 of LIPIcs, pp. 25:1-25:14. Schloss Dagstuhl-Leibniz-Zentrum fuer Informatik, 2016, 20 pages.

Gillat Kol and Moni Naor. Cryptology and game theory: Designing protocols for exchanging information. In Theory of Cryptography Conference, pp. 320-339. Springer, 2008, 21 pages.

Ramakrishna Kotla, Lorenzo Alvisi, Mike Dahlin, Allen Clement, and Edmund Wong. Zyzzyva: speculaive byzantine fault tolerance. In ACM SIGOPS Operating Systems Review, vol. 41, pp. 45-58. ACM, 2007, 14 pages.

Leslie Lamport. Fast paxos. Distributed Computing, 19(2):79-103, 2006, 43 pages.

Shengyun Liu, Christian Cachin, Vivien Quema, and Marko Vukolic. XFT: practical fault tolerance beyond crashes. In 12th USENIX Symposium on Operating Systems Design and Implementation, pp. 485-500. USENIX Association, 2016, 17 pages.

Anna Lysyanskaya and Nikos Triandopoulos. Rationality and adversarial behavior in multi-party computation. In Annual International Cryptology Conference, pp. 180-197. Springer, 2006, 18 pages.

Dahlia Malkai and Michael Reiter. Byzantine quorum systems. In Proceedings of the Twenty-ninth Annual ACM Symposium on Theory of Computing, STOC '97, pp. 569-578, New York, NY, USA, 1997. ACM, 10 pages.

J-P Martin and Lorenzo Alvisi. Fast byzantine consensus. IEEE Transactions on Dependable and Secure Computing, 3(3):202-215, 2006, 16 pages.

David Maziers. The stellar consensus protocol: A federated model for internet-level consensus, 2015, 32 pages.

Silvio Micali. Algorand: The efficient and demochratic ledger. arXiv:1607.01341, 2016, 75 pages.

Andrew Miller, Yu Xia, Kyle Croman, Elaine Shi, and Dawn Song. The honey badger of bft protocols. In Proceedings of the 2016 ACM SIGSAC Conference on Computer and Communications Security, pp. 31-42. ACM, 2016, 12 pages.

Rafael Pass and Elaine Shi. Thunderalla: Blockchains with optimistic instant confirmation. In Annual International Conference on the Theory and Applications of Cryptographic Techniques, pp. 3-33. Springer, 2018, 74 pages.

Jian Yin, Jean-Philippe Martin, Arun Venkataramani, Lorenzo Alvisi, and Mike Dahlin. Separating agreement for execution for byzantine fault tolerance services. ACM SIGOPS Operating Systems Review, 37(5):253-267, 2003, 15 pages.

Maofan Yin, Dahlia Malkhi, Michael K Reiter, Guy Golan Gueta, and Ittai Abraham. Hotstuff: BFT Consensus in the Lens of Blockchain. arXiv preprint arXiv:1803.05069, 2018, 23 pages.

Ittai Abraham, Dahlia Malkhi, Kartik Nayak, Ling Ren, and Maofan Yin. Sync hotstuff: Simple and practical state machine replication. Cryptology ePrint Archive, Report 2019/270, 2019, 13 pages.

Danny Dolev and H. Raymond Strong. Authenticated algorithms for byzantine agreement. SIAM Journal of Computing, 12(4):656-666, 1983, 11 pages.

Jonathan Katz and Chiu-Yuen Koo. On expected constant-round protocols for byzantine agreement. Journal of Computer and System Sciences, 75(2):91-112, 2009, 27 pages.

Leslie Lamport, Robert Shostak, and Marshall Pease. The byzantine generals problem. ACM Transactions on Programming Languages and Systems, 4(3):382-401, 1982, 51 pages.

Nancy A Lynch. Distributed algorithms. Elsevier, 1996, 899 pages.

Silvio Micali and Vinod Vaikunanathan. Optimal and player-replaceable consensus with an honest majority. 2017, 10 pages.

M. Pease, R. Shostak, and L. Lamport. Reaching agreement in the presence of faults. J. ACM, 27(2):228-234, Apr. 1980, 7 pages.

Fred B Schneider. Implementing fault-tolerant services using the state machine approach: A tutorial. ACM Computing Surveys (CSUR), 22(4):229-319, 1990, 21 pages.

Unknown, "Flexible Byzantine Fault Tolerance", Simons Institute, YouTube video https://www.youtube.com/watch?v=PYrH8cPTnmQ, published Oct. 23, 2019, 22 pages.

Nayak, Kartik, "Flexible Byzantine Fault Tolerance", Stanford Security Seminar, YouTube video https://www.youtube.com/watch?v=7JkBecj2dNs, published Jul. 24, 2019, 28 pages.

\* cited by examiner

FLEXIBLE BYZANTINE FAULT TOLERANCE

CROSS-REFERENCE TO RELATED APPLICATIONS

This application is a continuation of U.S. patent application Ser. No. 17/746,066, filed May 17, 2022, entitled "Flexible Byzantine Fault Tolerance", which is a continuation of U.S. patent application Ser. No. 17/107,630, filed Nov. 30, 2020, entitled "Flexible Byzantine Fault Tolerance", which claims the benefit of U.S. Provisional Patent Application No. 63/014,107 filed on Apr. 22, 2020, the disclosures of which are all incorporated herein by reference in their entirety.

BACKGROUND

Byzantine fault tolerant (BFT) protocols work in a homogeneous model to build replicated services, such as the algorithmic foundation of what are known as decentralized ledgers. These BFT protocols function by a service administrator picking a set of assumptions (e.g., timing model and the fraction of Byzantine faults) and imposing these assumptions on all clients using the service. The assumptions made by the protocol designer are imposed upon all parties involved such that every replica maintains the service as well as on every client using the service. This protocol collapses if it is deployed under settings that differ from the one it is designed for. In particular, optimal-resilience partially synchronous solutions can completely break if the fraction of Byzantine faults exceeds one-third. Similarly, optimal-resilience synchronous solutions can break if the fraction of Byzantine faults exceeds one-half or if the synchrony bound is violated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Various embodiments and examples of the present disclosure provide systems and methods of flexible byzantine fault tolerance.

In one example, a method for performing a flexible byzantine fault tolerance (BFT) protocol for a consensus is provided. The method includes sending, from a client device, a proposed value to a plurality of replica devices and receiving, from at least one of the plurality of replica devices, a safe vote on the proposed value. The at least one of the plurality of replica devices determines to send the safe vote based on a first quorum being reached and the safe vote is sent to the client device and each of the other replica devices of the plurality of replica devices. The method further includes determining that a number of received safe votes, received from the at least one of the replica devices, for the proposed value meets or exceeds a second quorum threshold, selecting the proposed value based on the determination, and setting a period of time within which to receive additional votes from at least one of the plurality of replica devices. The period of time is a network delay bound for a single view of a BFT protocol. The method further includes, based on the period of time elapsing without receiving the additional votes, committing the selected value for the single view of the BFT protocol.

In another example, a system configured to perform a flexible byzantine fault tolerant (BFT) protocol for a consensus is provided. The system includes a client device and a plurality of replica devices. The client device includes a transceiver configured to transmit and receive signals and a processor configured to control the transceiver to send, to a plurality of replica devices, a proposed value. Each of the plurality of replica devices includes a transceiver configured to receive the proposed value from the client device and a processor configured to determine to send a safe vote based on a first quorum threshold being reached. The transceiver of the replica device is further configured to transmit the safe vote to the client device and each of the other plurality of replica devices. The processor of the client device is further configured to determine that a number of received safe votes, received from at least one of the replica devices, for the proposed value meets or exceeds a second quorum threshold, select the proposed value based on the determination, set a period of time within which to receive additional votes from at least one of the plurality of replica devices, wherein the period of time is a network delay bound for a single view of the BFT protocol, and based on the period of time elapsing without receiving the additional votes, commit the selected value for the single view of the BFT protocol.

In yet another example, a non-transitory computer storage medium is provided. The medium stores instructions executable by a first computer system at a first site that, when executed by a processor of the first computer system, cause the processor to send, from a client device, a proposed value to a plurality of replica devices, receive, from at least one of the plurality of replica devices, a safe vote on the proposed value, wherein the at least one of the plurality of replica devices determines to send the safe vote based on a first quorum being reached and the safe vote is sent to the client device and each of the other replica devices of the plurality of replica devices, determine that a number of received safe votes, received from the at least one of the replica devices, for the proposed value meets or exceeds a second quorum threshold, select the proposed value based on the determination, set a period of time within which to receive additional votes from at least one of the plurality of replica devices, wherein the period of time is a network delay bound for a single view of a BFT protocol, and based on the period of time elapsing without receiving the additional votes, commit the selected value for the single view of the BFT protocol.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 6B, the systems are illustrated as schematic drawings. The drawings may not be to scale.

DETAILED DESCRIPTION

Figure 1:
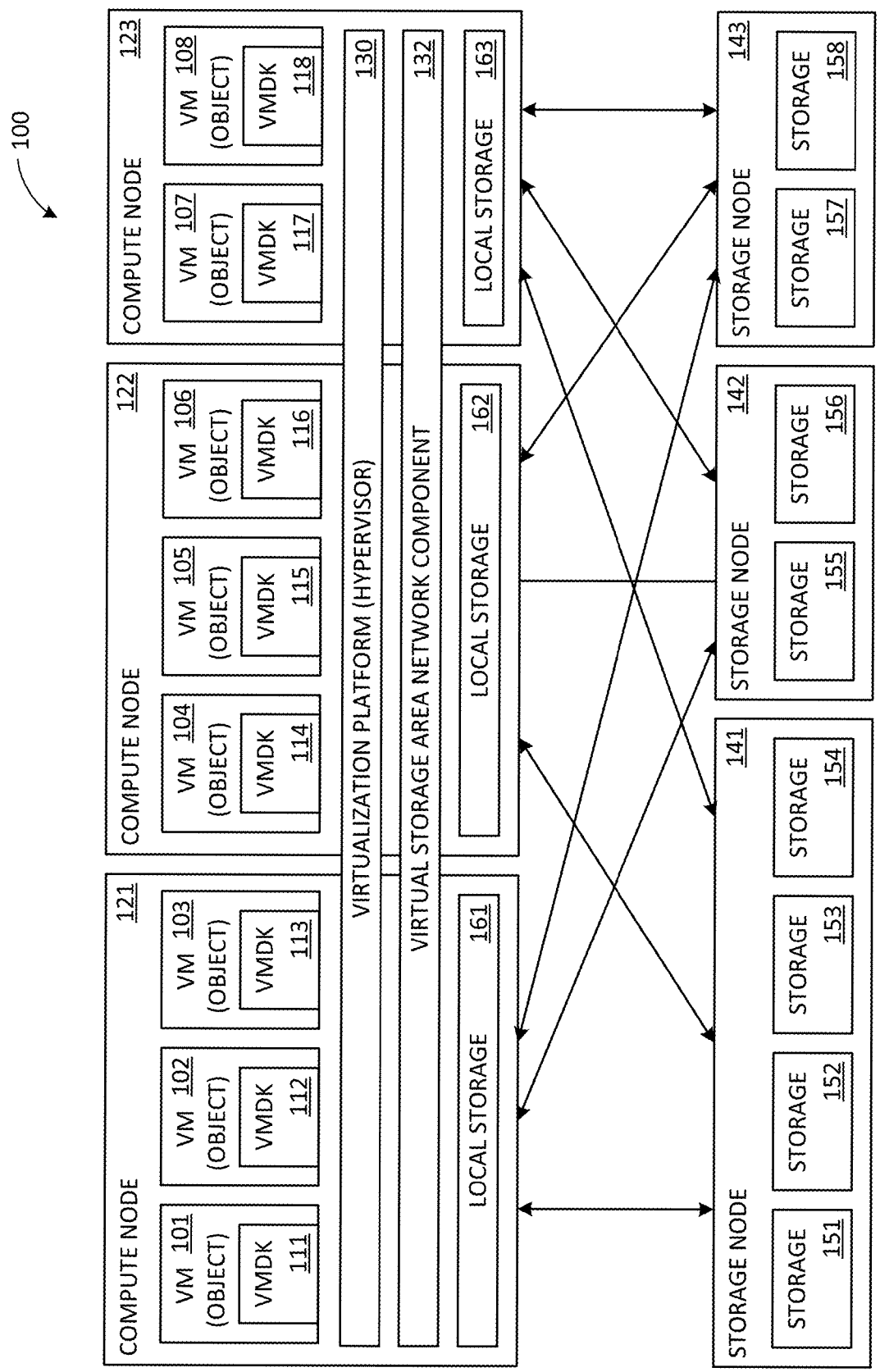
FIG. 1 illustrates a block diagram illustrating a system architecture according to various examples of the present disclosure.

FIGS. 1 through 6B, discussed below, and the various examples used to describe the principles of the present disclosure are by way of illustration only and should not be construed in any way to limit the scope of the present disclosure. Those skilled in the art will understand that the principles of the present disclosure may be implemented in any suitably arranged systems or methods.

As noted above, BFT protocols can collapse under settings other than the ones which the protocol was designed for, such as where difficult replica devices operate under separate assumptions. To address at least these deficiencies, the present disclosure presents a flexible BFT protocol with greater resiliency and diversity. For example, the flexible BFT protocol can tolerate more than 1/3 faults in a partial-synchrony model in accordance with improved resiliency bounds. Additionally, the flexible BFT protocol enables a degree of separation between a fault model and the protocol design to allow heterogenous clients operating under different fault and timing assumptions (whether synchrony or not) to participate in the same protocol.

The flexible BFT protocol as described herein enables improved resiliency bounds. In a byzantine fault tolerance, a replica can attempt to violate both safety, which can provide the attacker gains, such as a double spend attack, and liveness bounds, which generally does not provide the attacker gains. The flexible BFT protocol utilizes a mixed fault model that includes alive-but-corrupt (ABC) faults, by which an ABC replica attempts to violate the safety but not the liveness. ABC faults can gain rewards from keeping the replicated service alive, such as by collecting service fees. Various examples described herein provide flexible BFT protocols that tolerate a combination of Byzantine and ABC faults that exceed a first threshold in a partially synchronous model and exceed a second threshold in the synchronous model. Existing resilience bounds are not violated because the fraction of Byzantine faults is smaller than the respective bounds.

The flexible BFT protocol further enables separation between the fault model and the protocol design by allowing clients that operate under assumptions that can be difference to co-exist in the same protocol. In particular, the flexible BFT protocol allows each client to specify (i) their tolerated fault threshold and (ii) the message delay bound they accept. For example, a first client can require a tolerance against 1/5 Byzantine faults plus 3/10 ABC faults, a second client can require a tolerance against 1/10 Byzantine faults plus 1/2 ABC faults, and a third client can require synchrony, a tolerance against 3/10 Byzantine faults and 2/5 ABC faults. The flexible BFT protocol can support all three clients simultaneously despite the separate assumptions of each client.

The flexible BFT protocol considers that different clients naturally hold different assumptions about a system. For example, some clients may be more cautious and require a higher resilience than others, while some clients may believe in synchrony while others do not. Further, even the same client may assume a larger fraction of faults when dealing with transactions of different amounts, such as a $1M transaction compared to a $5 transaction. The rationale is that more replicas may be willing to collude to double spend a high-value transaction. In addition, if a client observes votes to conflicting values, which indicates the safety of the system is under attack, the client can choose to be more cautious and require higher resilience than usual. For example, if a client who believes in synchrony notices abnormally long message delays, which may be an indication of an attack on network infrastructure, the client can update its synchrony bound to be more conservative or switch to a partial-synchrony assumption.

The flexible BFT protocol commits a value at the leader device, or system administrator. Clients operating in a single protocol can have different assumptions leading to different commit rules. Accordingly, one client can vote to commit a value whereas another client may not. As described herein, the flexible BFT protocol allows any two clients who assumptions are correct, although potentially different, to vote to commit or not commit to the same value. If a client's assumption is incorrect, the client may vote to commit inconsistent values which may be reverted later. For example, if a client performs conflicting votes to commit, the client can update its assumption to be more cautious and re-interpret what values are voted to be committed under the new assumption. This recovery behavior allows a value that has previously been voted on to commit, but subsequently an alternative longer fork appears, the vote to commit can be reverted. Going forward, the client can increase the number of confirmations required to vote to commit.

The flexible BFT protocol can improve resiliency bounds and enable separation between the fault model and the protocol design by at least two techniques. First, the flexible BFT protocol utilizes a novel synchronous BFT protocol. The synchronous BFT protocol uses replicas that execute at network speed, and the BFT protocol does not assume synchrony. In this way, clients operating in the same protocol can assume different message delay bounds and therefore commit at each client's own pace. In other words, the timing assumptions are able to be separated from the fault model because the act of committing a value is carried out by the client, rather than replica devices. Second, the flexible BFT protocol breaks down the roles of quorums in different steps of partially synchronous BFT protocols. The roles of the quorums can be broken down because of the separation of the timing assumptions form the fault model. For example, one quorum size can be used for the replicas to run the flexible BFT protocol and another quorum size can be used by a client device to commit in the protocol.

Accordingly, examples of the present disclosure provide a synchronous protocol where the commit step requires synchrony, but the replicas may not. Because the replicas do not commit, the flexible BFT protocol can simultaneously support clients that assume different synchrony bounds. Furthermore, examples of the present disclosure provide flexible byzantine quorums that support clients that assume different fault models. Accordingly, the flexible BFT protocol supports clients that may have varying fault and timing assumptions in the same protocol and tolerate a fraction of combined Byzantine and ABC faults, extending resilience bounds. Further, the replica run one protocol (that does not care about thresholds or delta), and each client can use its (possibly different) commit rule, while the replica protocol does not change. In this manner, one protocol supports several different clients with possibly different trust assumptions.

Example computing environments are next described.

FIG. 1 illustrates a block diagram illustrating a system architecture according to various examples of the present disclosure. The example of the system architecture 100 illustrated in FIG. 1 is for illustration only. Other examples of the system architecture 100 can be used without departing from the scope of the present disclosure. For example, while the system architecture 100 illustrates a specific virtualized environment including virtual machines (VMs), compute nodes, storage nodes, and more arranged in a virtual storage area (VSAN) environment, aspects of the disclosure are operable in other virtualized environments (e.g., without VSAN). The disclosure is also operable in non-virtualized environments, in which each node is a separate physical machine connected by a network.

The system architecture 100 includes a set of compute nodes 121-123 interconnected with each other and a set of storage nodes 141-143 according to an example. In other examples, a different number of compute nodes and storage nodes may be used. Each compute node hosts multiple objects, which may be VMs, containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

Thin provisioning may be used, and in some examples, storage nodes 141-143 do not require significantly more processing power than is needed for handling I/O traffic. This arrangement may be less expensive than in an alternative example in which all of storage nodes 141-143 have the same or similar processing capability as compute node 121. Using the disclosure, compute nodes 121-123 are able to operate with a wide range of storage options, including those with minimal processing capability.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. Virtual SAN component 132 permits objects 101 and 102 to write incoming data from object 101 and incoming data from object 102 to storage nodes 141, 142, and/or 143, in part, by virtualizing the physical storage components of the storage nodes.

Figure 2:
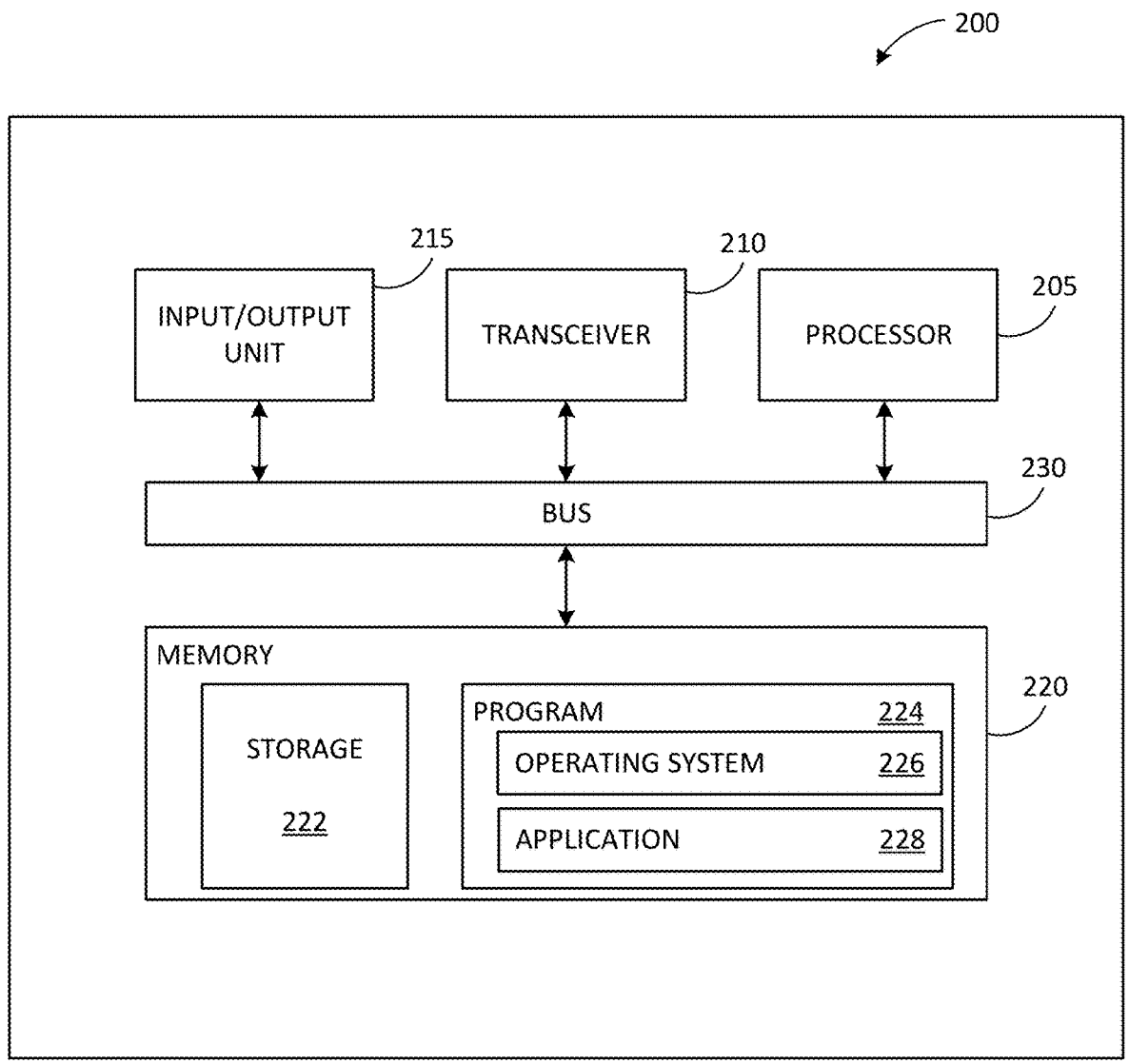
FIG. 2 illustrates an electronic device according to various examples of the present disclosure.

FIG. 2 illustrates an electronic device according to various examples of the present disclosure. The example of the electronic device 200 illustrated in FIG. 2 is for illustration only. Other examples of the electronic device 200 can be used without departing from the scope of the present disclosure.

The electronic device 200 includes a processor 205, a transceiver 210, an input/output (I/O) unit 215, and a memory 220. The processor 205, the transceiver 210, the I/O unit 215, and the memory 220 are connected to one another by a bus 230 to send messages between each of the components of the electronic device 200. The memory 220 further includes a storage 222 to store data and various programs 224. The programs 224 include an operating system 226 and one or more applications 228 that can be executed by the processor 205.

The processor 205 is configured to execute the operating system 226 and the one or more applications 228 stored in the memory 220. The applications 228 include particular program code executed by the processor 205 that can perform one or more of the functions described in greater detail below.

The transceiver 210 is configured to send and receive signals to and from, respectively, the electronic device 200. For example, the transceiver 210 can send and receive signals to an external device, such as a user equipment (UE), a server, or any other suitable electronic device.

The I/O unit 215 is configured to allow the electronic device 200 to directly connect to another device. For example, the I/O unit 215 can include one or more ports configured to allow connections to and from the electronic device 200.

In various examples, the electronic device 200 can be implemented in any one of the compute nodes 121, 122, 123 or the storage nodes 141, 142, 143. For example, when implemented in the system 100, the processor 205 of the compute node 121 can transmit and receive signals to each of the storage nodes 141, 142, 143 via the transceiver 210 by executing instructions in the program code of an application 228 stored in the memory 220. The electronic device 200 can be a UE, a server, or any other suitable electronic device.

Figure 3:
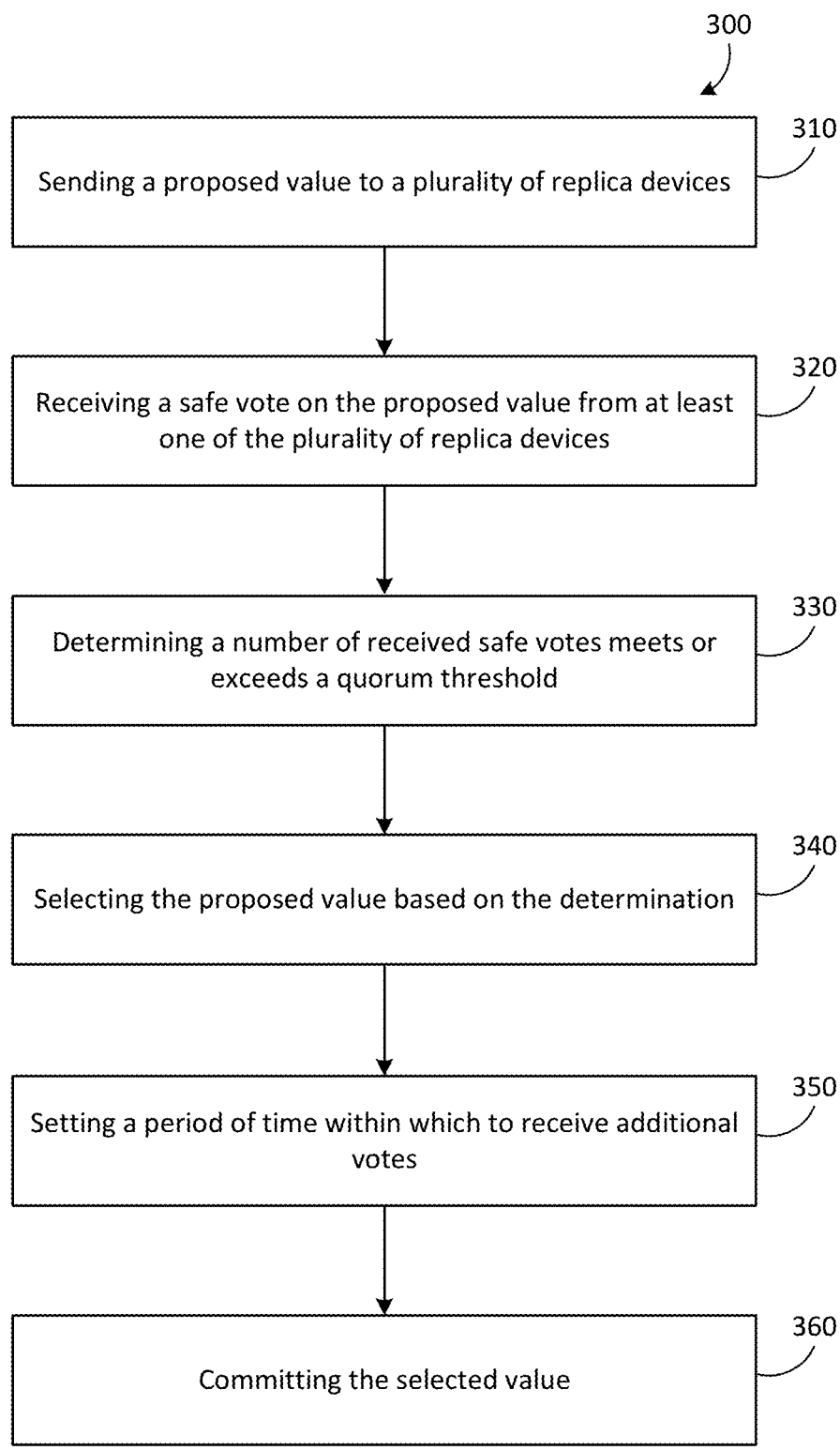
FIG. 3 illustrates a method of executing a flexible BFT protocol for a consensus according to various examples of the present disclosure.

FIG. 3 illustrates a method of executing a flexible BFT protocol for a consensus according to various examples of the present disclosure. The method 300 illustrated in FIG. 3 can be implemented by one or more of the elements illustrated in FIG. 1 and the electronic device 200 illustrated in FIG. 2. In particular, the method 300 is a method of executing a flexible BFT protocol for a consensus for a single view of a BFT protocol.

In operation 310, a client device sends a proposed value to a plurality of replica devices. The client device can be the electronic device 200 and each of the plurality of replica devices can be the electronic device 200. The proposed value is received at each of the plurality of replica devices. Each of the plurality of replica devices determines whether to send a safe vote based on a first quorum threshold being reached. The first quorum threshold refers to a variable fault tolerance that may be different for each of the plurality of replica devices. For example, a first replica device can have a one first quorum threshold while a second replica device can have another first quorum threshold.

Each replica device determines whether the proposed value received from the client device meets or exceeds its particular first quorum threshold. Based on the proposed value meeting or exceeding the first quorum threshold, a replica device determines to transmit a safe vote. The safe vote can indicate an agreement with the proposed value. Based on the proposed value not meeting or exceeding the first quorum threshold, a replica device determines to transmit a non-safe vote. In a particular flexible BFT protocol, any number of the plurality of replica devices can determine to send a safe vote. For example, one replica device can send a safe vote, multiple replica devices can send a safe vote, or zero replica devices can send a safe vote. Each particular replica device sends, or broadcasts, a safe or not-safe vote to the client device and each of the other replica devices. In some examples, each broadcast of a safe vote or a non-safe vote can also act as a re-broadcast of the proposed value for each of the other replica devices.

In operation 320, the client device receives a safe vote from at least one of the plurality of replica devices. For example, a replica device can send, or broadcast, the safe vote to the client device and each of the other replica devices. In some examples, the client device can receive a safe vote from more than one replica device. The client device collects each vote, including safe votes and non-safe votes, from the plurality of replica devices.

In operation 330, the client device determines whether the number of received safe votes meets or exceeds a second quorum threshold. The second quorum threshold is a variable threshold determined by the client device, based on varying levels of a safety tolerance and a liveness tolerance of the client device, referring to a required number of safe votes from the replica devices for the proposed value to be committed. For example, a client device can set the second quorum threshold to require ¼ safe votes, ½ safe votes, ¾ safe votes, or any other suitable threshold.

In operation 340, the client device selects, or locks, the proposed value based on the determination the received safe votes meets or exceeds the second quorum threshold. For example, the client device can determine that the number of safe votes meets or exceeds the second quorum threshold. By selecting, or locking, the proposed value, the client device preliminarily determines to commit the proposed value. For example, the client device can plan to commit the proposed value at a later time, but continue to wait for votes of other replica devices that may change the percentage of the quorum threshold or for additional confirmation of safe votes for the proposed value. In some examples, selecting or locking the proposed value can be temporary. For example, a proposed value can be selected initially, but based on receiving additional votes that cause the second quorum threshold to not be met or exceeded, the proposed value can be unlocked.

In operation 350, the client device sets a period of time within which to receive additional votes. As described above, various replica devices can operate under separate network delay bounds. The period of time is set by the client device, described herein as 2Δ, and represents a maximum network delay for a single view of a BFT protocol. By setting a maximum network delay equal to 2Δ, each replica device has sufficient time to broadcast a safe or non-safe vote. Accordingly, setting the period of time increases the likelihood that no votes, either safe or non-safe, from one or more of the replica devices are missed and therefore, an accuracy of the value that is ultimately committed is more reliable.

In operation 360, the client device commits the selected value. The client device can commit the selected value, for the particular view, based on the period of time equal to 2Δ elapsing without receiving additional votes. In addition, the client device can further commit the selected value based on not receiving an amount of non-safe votes within the period of time 2Δ that, if received, would cause the variable threshold to not be met or exceeded.

Various examples of the present disclosure recognize that early iterations of synchronous protocols relied on synchrony to assume a maximum network delay Δ for communications and required a lock step execution. In other words, all the replicas are in the same round at the same time. Often times, in practical applications Δ in insufficient and lock step execution is impractical or impossible. Some proposed solutions have required longer network delays or removed wait times when a leader is honest, but in practice the leader may not be honest or it may have to be determined that the leader is honest, which can take up valuable time.

Accordingly, various examples of the present disclosure provide a synchronous protocol where replicas execute at the network speed. For example, replica devices can run a partially synchronous protocol without relying on the synchrony at any point while the client device relies on synchrony bounds to commit. The separation between the replica devices running independently of synchrony bounds and only the client relying on synchrony bounds allows various devices to be supported with different assumptions on the value of Δ. This separation also allows the protocol to tolerate a combined Byzantine plus ABC fault ratio greater than a half, while the Byzantine fault tolerance can still be less than half.

Figure 4A:
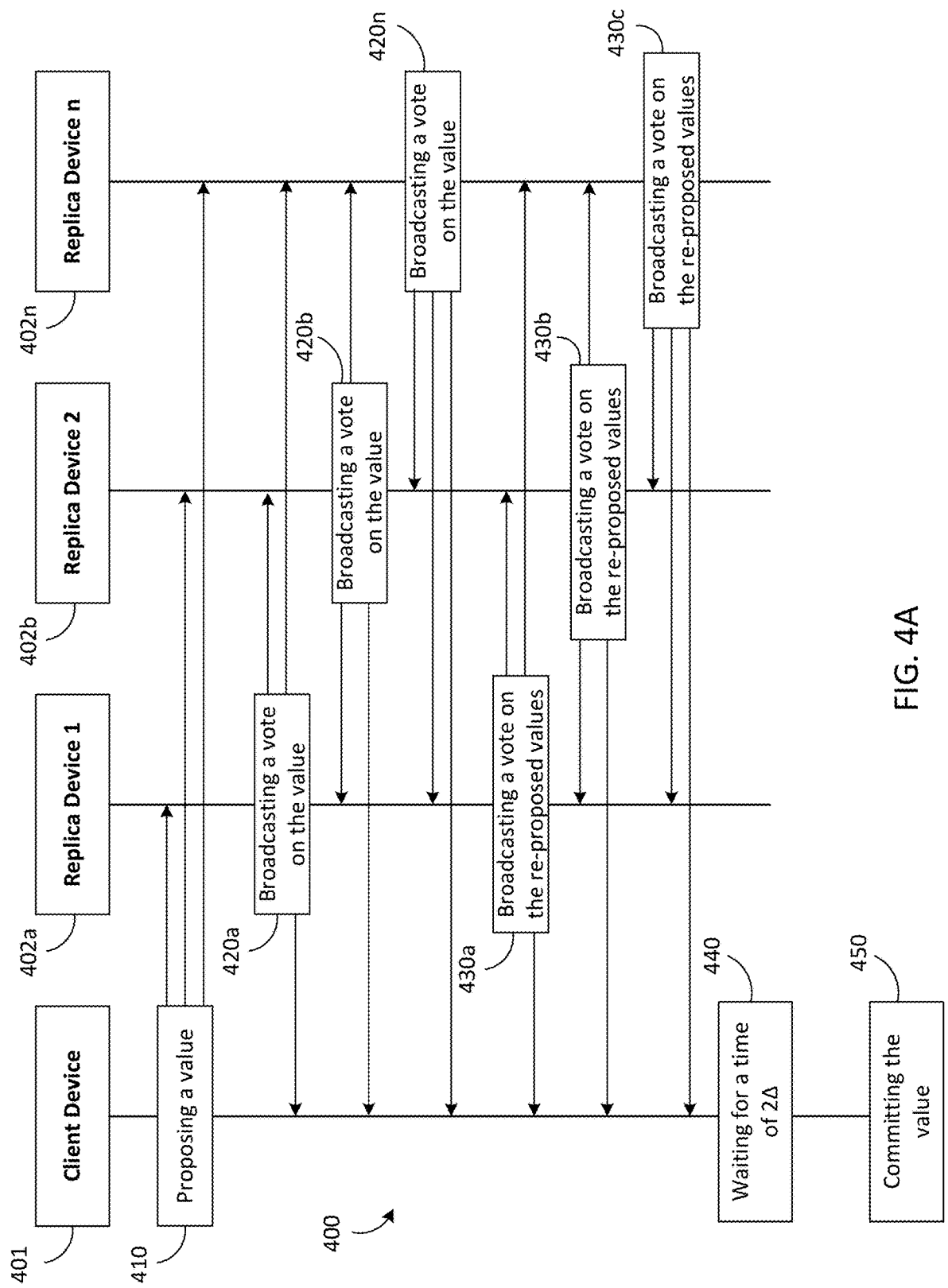
FIG. 4A illustrates a method of executing a flexible BFT protocol for a consensus according to various examples of the present disclosure.
Figure 4B:
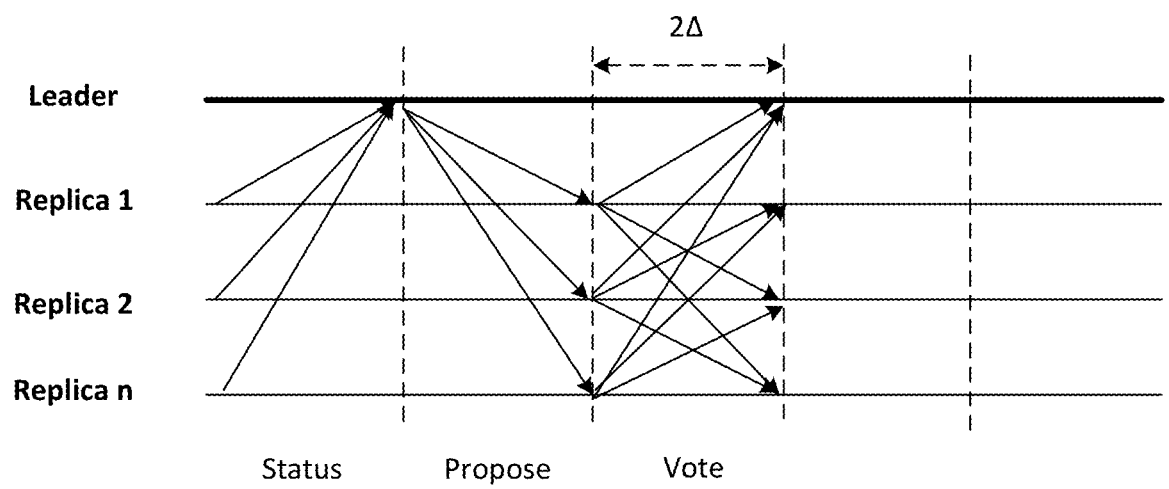
FIG. 4B is a visual representation of the method 400 illustrated in FIG. 4A, according to various examples of the present disclosure.

FIG. 4A illustrates a method of executing a flexible BFT protocol for a consensus according to various examples of the present disclosure. FIG. 4B is a visual representation of the method 400 illustrated in FIG. 4A. The method 400 illustrated in FIG. 4A can be implemented by one or more of the elements illustrated in FIG. 1 and the electronic device 200 illustrated in FIG. 2. In particular, the method 400 is a method of executing a flexible BFT protocol for a consensus for a single view of a BFT protocol. For each view, the flexible BFT protocol runs in two steps, a propose step and a vote step.

The method 400 is performed by a client device 401 and a plurality of replica devices 402. As illustrated in FIG. 4A, the method 400 is performed by the client device 401 and three replica devices, identified as replica device 1 402a, replica device 2 402b, and replica device n 402n. The client device 401 can be the client device that executes the method 300 for the flexible BFT protocol for the consensus illustrated in FIG. 3. The client device 401 can be a leader device for the particular view of the method 400. The method 400 runs in a sequence of views. Each view has a designated leader which is selected. In various examples, the leader can be selected in a round robin order or by any other suitable method.

Various examples of the present disclosure provide a replicated service that can take requests from clients and provide clients with an interface of a single non-faulty server. In other words, the service provides clients with the same totally ordered sequence of values. Each of the replica devices 402 can be a server such as the electronic device 200. Each of the replica devices 402 can tolerate a various number of faulty servers. As described herein, n represents the number of replica devices 402 and the set size of a set of replicas is denoted as its fraction over n. Therefore, a set of m replicas is referred to as q replicas where q=m/n. Each replica device can perform a replicated service, which has three logical actors. A proposer is capable of sending new values, an acceptor adds the values to a totally ordered sequence, called a blockchain, and a learner decides on a sequence of values based on the transcript of the protocol and executes the sequence on a state machine. In a replicated service, the client device 401, or leader, acts as the proposer and learner and the replica devices 402 act as the acceptor. Accordingly, safety and liveness guarantees are defined with respect to the heterogenous clients.

Iterations of existing replication protocols assumes that learners are homogenous. In other words, the learners are assumed to interpret a transcript using the same rules and therefore decide on the same sequence of values. Various examples of the present disclosure recognize that the learners may not interpret the transcript using the same rules and do not decide on the same sequence of values. Accordingly, the examples described herein enable the heterogenous learners such as the replica devices 402 to interpret the transcript of the protocol differently, each according to their own separate assumptions. In particular, the examples of the present disclosure provide a flexible BFT protocol that ensures that, as long as the assumptions of different learners are each correct, each learner learns the same set of values. This protocol satisfies both the safety for heterogenous learners property and the liveness for heterogenous learners property. The safety for heterogenous learners property provides any two or more learners with correct, but potentially different, assumptions to learn the same sequence of values. The liveness for heterogenous learners property provides that a value proposed by a proposer will eventually be executed by every learner with a correct assumption.

In some examples, the assumptions can be different types of faults between the replicas. For example, some replicas can assume Byzantine faults whereas other replicas can assume ABC faults. As described herein, Byzantine faults behave arbitrarily and ABC faults attack safety but preserve liveness. As described in the context of the flexible BFT protocol, the adversary is assumed to be static. In other words, the adversary determines which replicas are Byzantine and ABC before the protocol is started. Under this novel fault method, the safety proof treats ABC replicas similarly to Byzantine. Then, once safety is proved, the liveness proof can treat ABC replicas similarly to honest replicas. In other examples, the assumptions can refer to hash functions, digital signatures, and a public-key infrastructure (PKI). x R can be used to denote a message x signed by a replica R. Pair-wise communication channels can be assumed to be used between replicas. All replicas can be assumed to have clocks that advance at the same rate.

In operation 410, the client device 401 transmits a proposed value b to each of the replica device 1 402a, replica device 2 402b, and replica device n 402n. For example, the proposed value can represent a set, or block, of one or more client commands. Each of the replica device 1 402a, replica device 2 402b, and replica device n 402n receives the proposed value from the client device 401. Each of the replica device 1 402a, replica device 2 402b, and replica device n 402n can operate based on separate assumptions. Therefore, in some examples, one or more of the replica device 1 402a, replica device 2 402b, and replica device n 402n can evaluate the proposed value based on different criteria and determine whether or not the proposed value meets its respective first quorum threshold. For example, if a replica device 402 observes a set of $q_r$ votes on b, called a certificate Cqr (b), the replica device 402 locks on, or selects, b. When the replica device 402 locks b, the replica device 402 determines to continue transmitting a safe vote for the proposed value b in response to other re-proposals from other replica devices. In some examples, the replica device 402 can further determine to continue transmitting a safe vote for the proposed value b in additional views. In other examples, in subsequent views, the replica device 402 may determine to not transmit a safe vote for a value other than b unless the replica device 402 learns that $q_r$ replicas are not locked on b.

Each of the replica device 1 402a, replica device 2 402b, and replica device n 402n can determine whether the proposed value meets or exceeds the respective first quorum threshold. In operation 420, each of the replica device 1 402a, replica device 2 402b, and replica device n 402n broadcasts either a safe vote or a non-safe vote on the proposed value. The safe vote indicates the first quorum threshold of the particular replica device 402 is met or exceeded, whereas the non-safe vote indicates the first quorum threshold of the particular replica device 402 is not met.

As described herein, each of the replica devices 402 can execute different protocols with different delay bounds. For example, the replica device 1 402a can execute a first protocol with a first delay bound while the replica device 2 402b executes a second protocol with a second delay bound. In some examples, the first delay bound of the replica device 1 402a can be different than the second delay bound of the replica device 2 402b. In some examples, only the client device 401 knows both the first delay bound and the second delay bound. In other words, each replica device 402 does not know, or need to know, the delay bounds under which the other replica devices 402 operate. By doing so, a single client device 401 serves different replica devices 402 that may each operate with different delay bounds in the same protocol.

As shown in FIG. 4A, the replica device 1 402a broadcasts a vote on the value 420a, replica device 2 402b broadcasts a vote on the value 420b, and replica device n 402n broadcasts a vote on the value 420n. The broadcasted votes are each sent to the client device and each of the other replica devices. For example, in operation 420, the broadcast from replica device 1 402a is received by the client device 401 and both the replica device 2 402b and the replica device n 402n, the broadcast from replica device 2 402b is received by the client device 401 and both the replica device 1 402a and the replica device n 402n, and the broadcast from replica device n 402n is received by the client device 401 and both the replica device 1 402a and the replica device 2 402b. In various examples, each broadcasted safe vote can serve as both a safe vote on the proposed value from the client device 401 and a re-proposal of the proposed value to each of the other replica devices 402.

In examples where the replica device 402 collects $q_r$ votes on b, denoted as Cqr (b) and called a certificate of b from view v, the replica device 402 locks on, or selects, b and records the lock time as t-lock$_v$. In examples where the replica device 402 observes a equivocating vote, indicating an equivocating value, signed by L at any time after entering view v, the replica device 402 records the time of equivocation as t-equiv$_v$. The replica device 402 blames the leader by broadcasting a blame message, v and the equivocating values. In examples where the replica device 402 does not receive a proposal for sufficient time in view v, the replica device 402 times out and broadcasts (blame, v). In examples where the replica collects a set of $q_r$ blame, v messages, the replica device 402 records the time as t-viewchange$_v$, broadcasts them, and enters view v+1.

In examples where the replica device 402 locks on a value b in a view, then the replica device 402 votes only for b in subsequent views unless it unlocks, or unselects, from b by learning that $q_r$ replicas are not locked on b in that view or higher. The replica device 402 may be locked on other values or may not be locked at all. The replica device 402 can unlock, or unselect, from b if it learns that $q_r$ replicas are not locked on b in that view or higher. The $q_r$ may be locked on other values or they may not be locked at all.

In operation 430, each of the replica devices 402 broadcasts a vote on the re-proposed values received from each of the other replica devices 402. As described herein, operation 430 can include a plurality of votes from each replica device 402. As noted above, as shown in FIG. 4A, each replica device 402 receives a broadcasted vote from two other replica devices 402. In operation 430, each replica device 402 broadcasts a vote on each proposed value received in operation 420 to each of the other replica devices 402.

In operation 440, the client device 401 sets a period of time 2Δ to wait for additional votes and waits for the time period of 2Δ to lapse. The time 2Δ can be a maximum network delay for communication between the client device 401 and the replica devices 402. In some examples, the client device 401 is the only device that knows, or is informed of, the value of 2Δ. In other words, none of the replica devices 402 know the value of 2Δ, and the replica devices 402 do not need to know the value of 2Δ for the BFT protocol to be executed. For example, the flexible BFT protocol increases safety if there are fewer than $q_r$ faulty replicas. The key argument for safety is that an honest replica h satisfies the commit condition for some value b in a view, then (a) no other value can be certified and (b) all honest replicas are locked on b at the end of that view. For example, satisfying the commit condition implies that some honest replica h has observed an undisturbed-2Δ period after it locked on b. In other words, the honest replica did not observe an equivocation or a view change. Suppose the condition is satisfied at time t. This implies that other replicas did not observe an equivocation or a view change before t Δ. These two properties hold if the quorum honesty conditions below hold. For liveness, if Byzantine leaders equivocate or do not propose a safe value, they will be blamed and a view change will ensue. Eventually, there will be an honest leader to drive consensus if quorum availability holds.

Since the undisturbed period starts after b is certified, the honest replica h must have voted, and re-proposed, b at a time earlier than t-2Δ. Every honest replica h must have received b before t-Δ. Since they had not voted for an equivocating value by then, they must have voted for b. Since the number of faults is less than $q_r$, every certificate needs to contain an honest replica's vote. Thus, no certificate for any other value can be formed in this view.

The honest replica h sends Cqr (b) at time t-2Δ. All honest replicas h receive Cqr (b) by time t Δ and become locked on b. For an honest h replica to unlock from b in subsequent views, $q_r$ replicas claim that they are not locked on b. At least one replica is honest and would need to falsely claim it is not locked, which cannot happen if it is an honest replica h.

In operation 450, the client device 401 commits the value b based on the votes received from the replica devices 402. For example, the client device 401 commits the value b based on the received votes from the replica devices 402 meeting or exceeding a quorum threshold. In various examples, the quorum threshold can be described as a second quorum threshold that can be different than the first quorum threshold used by the replica devices 402 to determine whether to send a safe vote or a non-safe vote. For example, the value b is considered to be committed by a client assuming Δ-synchrony if and only if $q_r$ replica devices 402 each report that there exists a view v such that (i) b is certified, i.e., Cqr (b) exists, and (ii) b is undisturbed, i.e., no equivocating value or view change was observed at a time before 2Δ after it was certified, or more formally, min (current-time, t-equiv$_v$, t-viewchange$_v$)-t-lock$_v$≥2Δ.

Therefore, as shown in FIG. 4A, the client device 401 commit rule is separated from the protocol design for the replica devices 402. In particular, the replica device 402 protocol does not rely on synchrony bounds although the flexible BFT protocol is a synchronous protocol. Accordingly, the client device 401 can determine its down message delay bounds and any client device 401 that utilizes a correct message delay bound can enjoy safety.

A traditional Byzantine replica does not exceed 1-$q_r$ so that $q_r$ replicas respond to the leader. If the protocol includes only honest and Byzantine replicas, and no ABC replicas, quorum honesty requires the fraction of Byzantine replicas B<$q_r$. Quorum availability requires B≤1-$q_r$. By optimizing to maximize B, $q_r$≥½ is obtained. Now, suppose P represents the fraction of alive-but-corrupt replicas. Quorum honesty requires B+P<$q_r$, and quorum availability requires B 1 $q_r$. Thus, the protocol supports varying values of B and P at different values of $q_r$>½ such that safety and liveness are both preserved.

Various examples of the present disclosure recognize two properties of Byzantine quorums to achieve safety and liveness. First, the present disclosure recognizes quorum intersection, where any two quorums can intersect at one honest replica. Second, the present disclosure recognizes quorum availability, which is a quorum that contains no Byzantine faulty replicas. For example, when less than ⅓ the replicas are Byzantine, quorums can be set to size $q_r$=⅔.

More particularly, $q_r$ is slightly larger than ⅔. In other words, 2f+1 out of 3f+1 where f is the number of faults, but $q_r$=⅔ is used for the sake of explanation and ease of exposition. This enables an intersection of size at least $2q_r-1=⅓$, hence at least one honest replica in the intersection. As for availability, $q_r$=⅔ honest replicas exist to form a quorum. This can also be referred to herein as achieving a quorum threshold. Liveness within each view can be ensured by having an honest quorum respond to a non-faulty leader.

Quorums can intersect within a single view or across views. For example, safety within a view can be ensured by the first round of votes. Each replica device 402 can vote only once per view. Accordingly, for two distinct values to both obtain certificates, one honest replica device would need to vote for both distinct values. When the replica device 402 votes only once per view, the honest replica device is not able to vote for both values. As another example, safety across view can be ensured by a locking mechanism that pre-determines the safe vote for the proposed value in a later period of time. For example, if b becomes a committed decision in a view, then a quorum of replicas lock on b in that view. For an honest replica among them to unlock from b, a quorum of replicas need to claim they are not locked on b. At least one replica in the intersection is honest and would need to falsely claim it is not locked, which cannot happen. In another example, the proposed value b can be unlocked based on the replica device 402 detecting that at least one of the other plurality of replica devices 402 has not locked the proposed value.

As noted above, various examples of the present disclosure separates quorum thresholds for the replicas, which act as the acceptors, from the quorum thresholds used by the client devices for learning when a decision becomes committed. For example, the quorum used for forming certificates (locking) is denoted by $q_{lck}$ and the quorum used for unlocking is denoted by $q_{ulck}$. The quorum employed by clients for learning certificate uniqueness is denoted by $q_{unq}$, and the quorum used for learning commit safety is denoted by $q_{cmt}$. In other words, clients mandate $q_{unq}$ first-round votes and $q_{cmt}$ second-round votes in order to commit a decision. Accordingly, various examples of the present disclosure provide a protocol that uses these different quorum sizes instead of a single quorum size q and introduces Flexible Byzantine Quorums, which capture the requirements needed for these quorums to provide safety and liveness.

As described in the description of FIG. 4A, a client device acting as the leader device proposes a value b. In a first vote, upon receiving the first value b for a view v, a replica votes for b if it is safe as determined by the locking mechanism described below. A set of qlck votes forms a certificate Cqlck (b). In a second vote, upon collecting Cqlck (b), a replica locks on, or selects, b and votes for Cqlck (b). The leader device, upon collecting qunq votes for b and qcmt votes for Cqlck (b), a client learns that proposal b becomes a committed decision and commits the value b. The quorums utilized are flexible both within a view and across views, as described above. The proposed two voting steps are executed by the replicas and they are only parameterized by qr. The commit step can be carried by different clients using different commit thresholds qc. Thus, a fixed qr can determine a possible set of clients with varying commit rules in terms of Byzantine and ABC adversaries. As described herein, a Byzantine adversary can behave arbitrarily and thus may not provide liveness, whereas ABC adversary only intends to attack safety but not liveness. Thus, a client who believes that a large fraction of the adversary may attempt to break safety, not progress, can choose a larger qc. By doing so, it seeks stronger safety against dishonest replicas, while trading liveness. Conversely, a client that assumes that a large fraction of the adversary attacks liveness must choose a smaller qc.

For example, within a view, a pair of $q_{lck}$ certificates need not necessarily intersect in an honest replica. Locking on a value does not preclude conflicting locks, but only mandates that every $g_{lck}$ quorum intersects with every $q_{unq}$ quorum at at least one honest replica. For safety, the fraction of faulty replicas is less than $g_{lck}+q_{unq}-1$. As another example, across views, if a client commits a value b in a view, $q_{cmt}$ replicas lock on b in that view. For an honest replica to unlock from b, $q_{ulck}$ replicas need to claim they are not locked on b. Accordingly, every $q_{ulck}$ quorum intersects with every $q_{cmt}$ quorum at at least one honest replica. Thus, for safety, the fraction of faulty replicas is less than $q_{ulck}+q_{cmt}-1$.

As another example, the flexible quorum availability can also be described within each view. For liveness, Byzantine replicas cannot exceed $1-\max(q_{unq}, q_{cmt}, q_{lck}, q_{ulck})$ so that the aforementioned quorums can be formed at different stages of the protocol.

Therefore, the flexible BFT protocol can ensure safety if the fraction of faulty replicas is less than $\min(q_{unq}+q_{lck}-1, q_{cmt}+q_{ulck}-1)$ and provides liveness if the fraction of Byzantine replicas is at most $1-\max(q_{unq}, q_{cmt}, q_{lck}, q_{ulck})$. In some examples, balanced quorum sizes can be used where $q_{lck}=q_{ulck}$ and $q_{unq}=q_{cmt}$. For example, $q_{unq}+q_{lck}$ should be equal to $q_{cmt}+q_{ulck}$. If $q_{cmt}+q_{ulck}$ is less than $q_{unq}+q_{lck}$, then setting $(q_{cmt}, q_{ulck})$ to equal $(q_{unq}, q_{lck})$ can improve safety tolerance without affecting liveness tolerance. Next, if $q_{unq}+q_{lck}=q_{cmt}+q_{ulck}$ but $q_{lck}>q_{ulck}$ (and hence $q_{unq}<q_{cmt}$), then once again setting $(q_{cmt}, q_{ulck})$ to equal $(q_{unq}, q_{lck})$ improves safety tolerance without affecting liveness tolerance.

Accordingly, examples of the present disclosure assume $g_{lck}$32 $q_r$ and $q_{unq}=q_{cmt}=q_c$. Since replicas use $q_r$ votes to lock, or select, these votes can be used by the clients to commit $q_{cmt}$ quorums without restriction. Thus, $q_c \geq q_r$. The Flexible Byzantine Quorum requirements collapse into the following two conditions: for flexible quorum intersection, the fraction of faulty replicas is less than $q_c+q_r-1$ and for the flexible quorum availability, the fraction of Byzantine replicas is less than or equal to $1-q_c$.

Furthermore, the flexible BFT protocol can tolerate ABC faults. For example, if all faults in the system are Byzantine faults, then the parameter choice can be $q_c=q_r$⅔ for <⅓ fault tolerance. Flexible Byzantine Quorums degenerate to basic Byzantine quorums. However, in examples of the present disclosure, ABC replicas are interested in attacking safety but not interested in attacking liveness. Accordingly, $q_c+q_r-1$ total faults can be tolerated (Byzantine plus ABC faults), which can be more than ⅓. For example, if $q_r$=0.7 and $q_c$=0.8, then a protocol can tolerate 0.2 Byzantine faults plus 0.3 alive-but-corrupt faults. The choice for $q_r$ and $q_c$ and their rationale are described in greater detail below.

Various examples of the present disclosure recognize that multiple views of the flexible BFT protocol described herein can be performed in succession to form a chain of values. When performed in succession, this can be referred to as a pipelined protocol. The flexible BFT protocol can support, simultaneously, both a client that assumes partial synchrony, with freedom to choose $q_c$, or that assumes synchrony with its own choice of Δ.

In various examples, the pipeline protocol can form a chain of values, or blocks. The position of a block in the chain can be referred to as its height k. A block $B_k$ at height k has a format of $B_k=(b_k, h_{k-1})$, where $b_k$ denotes a proposed value at height k and $h_{k-1}=H(B_{k-1})$ is a hash digest of the predecessor block. The first block $B_1=(b_1, \perp)$ does not have a predecessor. Every subsequent block $B_k$ specifies a predecessor block $B_{k-1}$ by including a hash of it. If $B_k$ is an ancestor, but not necessarily a proper ancestor, of $B_l$ (l≥k), then $B_l$ extends $B_k$. A block is determined to be valid if either or both of (i) its predecessor is valid and (ii) its proposed value meets application-level validity conditions and is consistent with its chain of ancestors. For example, the proposed value is consistent with its chain of ancestors if the proposed value does not double spend a transaction in one of its ancestor blocks. In some examples, $B_l$ is considered to extend $B_k$, if $B_k$ is an ancestor of $B_l$ (l>k) and two blocks $B_l$ and $B_h$ can be considered to equivocate one another if they are not equal and do not extend one another.

Replicas can vote for blocks by signing the blocks. Cqr $(B_k)$ can be used to denote a set of signatures on $h_k=H(B_k)$ by $q_r$ replicas in view v. $q_r$ is a parameter fixed for the protocol instance. Cqr $(B_k)$ is a certificate for $B_k$ from view v. Certified blocks are ranked first by the views in which they are certified and then by their heights. In other words, a block $B_k$ certified in view v is ranked higher than a block $B_{k'}$ certified in view v′ if either (i) v>v′ or (ii) v=v′ and k>k′. At any time, a replica locks the highest certified block to its knowledge. During the protocol execution, each replica keeps track of all signatures for all blocks and continues to update its locked block. As described in greater detail herein, the notion of a locked block will be used to guard the safety of a client committing the value.

As described herein, the flexible BFT protocol progresses in a view-by-view manner. Each view has a designated leader device that is responsible for driving consensus on a sequence of blocks. In various examples, the leader can be chosen statically, e.g., round robin, or randomly using more sophisticated techniques. For ease of explanation, a round robin selection of leaders is described herein, but other examples are possible without departing from the scope of the present disclosure. In other words, (v mod n) is the leader of view v.

Figure 5A:
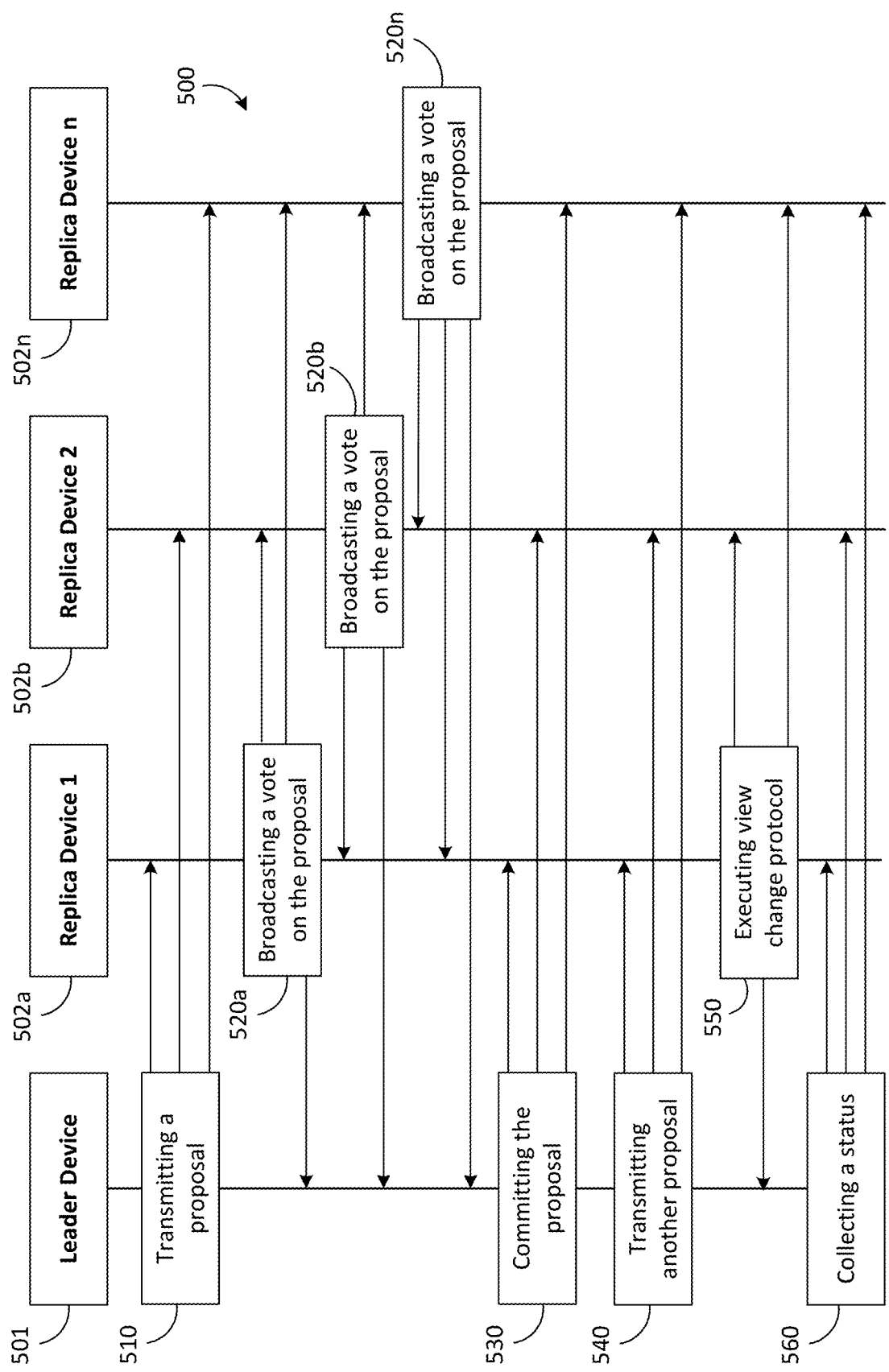
FIG. 5A illustrates a process of executing the flexible BFT protocol according to various examples of the present disclosure.

FIG. 5A illustrates a process of executing the flexible BFT protocol according to various examples of the present disclosure. The method 500 illustrated in FIG. 5A can be implemented by one or more of the elements illustrated in FIG. 1 and the electronic device 200 illustrated in FIG. 2. In particular, the method 500 is a method of executing the flexible BFT protocol for a consensus for multiple views of the BFT protocol.

The method 500 is performed by a leader device 501 and a plurality of replica devices 502. As illustrated in FIG. 5A, the method 500 is performed by the leader device 501 and three replica devices, identified as replica device 1 502a, replica device 2 502b, and replica device n 502n. The leader device 501 can be the client device 401 and the replica devices 502 can be the replica devices 402. The leader device 501 can be a leader for the particular view of the method 500. The method 500 runs in a sequence of views. Each view has a designated leader which is selected, or a particular device can be the leader until the need for a new leader is determined.

In operation 510, the leader device 501 transmits a proposal to each of the replica device 1 502a, replica device 2 502b, and replica device n 502n. Operation 510 can be performed analogous to operation 410.

In operation 520, each replica device 502 determines whether to broadcast a safe vote or a non-safe vote regarding the proposal. Operation 520 can be performed analogous to operation 420. For example, the broadcast from replica device 1 502a is received by the leader device 501, the replica device 2 502b and the replica device n 502n, the broadcast from replica device 2 502b is received by the leader device 501, the replica device 1 502a, and the replica device n 502n, and the broadcast from replica device n 502n is received by the leader device 501, the replica device 1 502a, and the replica device 2 502b.

In operation 530, the leader device 501 commits the proposal and begins the next iteration. By committing the proposal, the leader device 501 adds a new block onto a chain at an increasing height and prepares the next block. The client commit rules are described in greater detail below. For example, in operation 540, the leader device 501 transmits another proposal, as in operation 510, and operations 510-540 repeat.

In operation 550 one of the replica devices 502, illustrated in FIG. 5A as replica device 1 502a, executes the view change protocol. The view change protocol of operation 550 is illustrated in greater detail in FIG. 5B. Although illustrated in FIGS. 5A and 5B as being performed by the replica device 1 502a, the view change protocol of operation 550 can be executed by any of the replica devices 502 without departing from the scope of the present disclosure. If one of the replica devices 502 does not observe progress in a particular view v, has observed more than one height k block in the same view v, or detects malicious leader behavior, the replica device 502 quits the view v, stops voting in the view v, and sends a blame message $q_r$ (blame, v), to all other replica devices 502. A lack of progress can be determined by various methods, such as guessing a time bound for message arrival or by using increasing timeouts for each view.

Figure 5B:
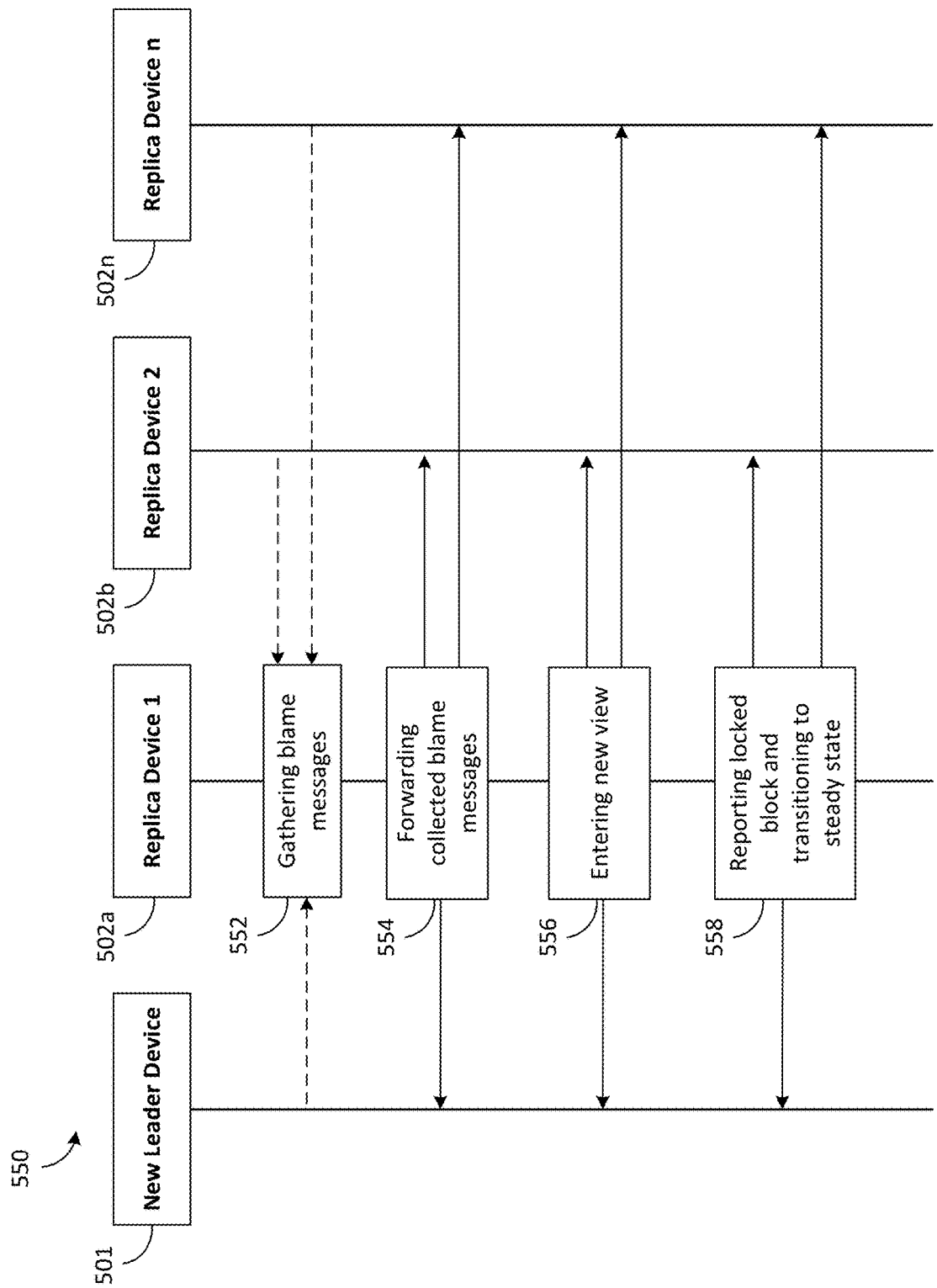
FIG. 5B illustrates a method of executing the view change protocol according to various examples of the present disclosure.

FIG. 5B illustrates a method of executing the view change protocol according to various examples of the present disclosure. Operation 550 illustrated in FIG. 5B can be implemented by one or more of the elements illustrated in FIG. 1 and the electronic device 200 illustrated in FIG. 2. For example, as shown in FIG. 5B, operation 550 can be implemented by one of the replica devices 402.

In operation 552, the replica device 1 502a gathers $q_r$ (blame, v) blame messages from any of the other replica devices 2 502b and n 502n that determine to send the $q_r$ (blame, v) blame message. For example, if only the replica device 2 502b sends the $q_r$ (blame, v) blame message, the replica device 1 502a collects the $q_r$ (blame, v) blame message from the replica device 2 502b.

In operation 554, the replica device 1 502a forwards the collected $q_r$ (blame, v) blame messages to each replica device 502. For example, when the replica device 2 502b sends the $q_r$ (blame, v) blame message, the replica device 1 502a forwards the $q_r$ (blame, v) blame message to the other replica devices 2 502b and n 502n to alert the replica device 2 502b, the replica device n 502n, and the current leader device 501 of the transmission of the $q_r$ (blame, v) blame message.

In some examples, the replica device 1 502a determines the quantity of the blame messages meets or exceeds a quorum threshold, described herein as the third quorum threshold. The third quorum threshold is a threshold that measures whether a sufficient quantity of blame messages have been received to replace the leader device.

In operation 556, the replica device 1 502a replaces the leader device and enters, or transitions to, a new view v+1. The replica device 1 502a can enter the new view v+1 based on the replacement of the leader device. The replica device 1 502a records the time at which the blame certificate is received as t-viewchange$_v$. In operation 558, the replica device 1 502a reports, to the leader device of the new view, a status of a locked block and transitions to the steady state. For example, if $B_j$ is the block locked by the replica, a status of its locked block is sent to the leader by each of the replica devices 502 using (status, v, B, C (B)) and transition to the steady state, where v is the view in which B was certified. The replacement leader device can change the second quorum threshold in the second view. For example, the replacement leader device changes to the second quorum threshold based on the replacement leader device having different, or varying, levels of a safety tolerance or a liveness tolerance than the original leader device for the original, or first, view. Different clients can choose different tradeoffs of safety and liveness.

In operation 560, shown in FIG. 5A, following the view change protocol, the replacement leader device collects a status from the replica devices 502 and, based on the collected statuses, continues to propose blocks based on the status $q_r$ status messages form the status S. The first block proposed in the new view should extend the highest certified block among these $q_r$ status messages.

In the steady state, entered after the view change, a unique leader proposes a block, waits for votes from $q_r$ replicas and moves to the next iteration. In the steady state, an honest leader always extends the previous block it proposed. However, immediately after a view change, since the previous leaders could have been Byzantine and may have proposed multiple conflicting blocks, the new leader must determine a safe block to propose. To do so, the new leader collects a status of locked blocks from $q_r$ replicas.

The new leader device 501 can broadcast (propose, $B_k$, v, $C_v I (B_{k-1})$, $S)_L$ to each of the replica device 1 502a, replica device 2 502b, and replica device n 502n. Here, $B_k:=(b_k, h_{k-1})$ is the newly proposed block and should extend the highest certified block to L. In the steady state, to be described in greater detail below, an honest leader L extends the previous block it proposed, in which case $v^i=v$ and $S=\perp$. Based on a replica device 502 receiving a valid proposal (propose, $B_k$, v, $C_v I (B_{k-1})$, $S)_L$ from the leader device 501, each replica device 502 broadcasts the proposal and a vote (vote, $B_k$, $v)_R$ if (i) R does not hold any lock, (ii) $B_k$ extends R's locked block, or (iii) S indicates that $q_r$ replicas are not locked on R's locked block.

Each replica device 502 tracks and records data based on the votes received from the other replica devices 502. For example, each replica device 502 tracks the number of votes received for the particular block in the particular view as $q_{Bk}v$. If block $B_{k-1}$ has been proposed in view v, it marks $B_{k-1}$ as a locked block and records the locked time as t-lock$_{k-1,v}$. For any block that equivocates with $B_{k-1}$ proposed in view v, the replica device 502 stores the timestamp t-equiv$_{k-1,v}$ at which an equivocating block or vote is received. The replica devices 502 then enter the next iteration. If the replica device 502 observes no progress or has observed more than height k block in the same view v, the replica device 502 quits the view v, stops voting in view v, and sends (blame, $v)_r$ message to all replicas.

For a replica device 502 in the steady state, on receiving a proposal for block $B_k$, the replica device 502 votes for the proposal if (i) the replica device 502 does not hold any lock, (ii) $B_k$ extends locked block of the replica device 502, or (iii) the status indicates that $q_r$ replicas are not locked on to the locked block of replica device 502. The replica device 502 can potentially receive blocks out of order and thus receive $B_k$ before its ancestor blocks. In this case, the replica device 502 waits until it receives the ancestor blocks, verifies the validity of those blocks and $B_k$ before voting for $B_k$. In addition, the replica device 502 records a number of votes, lock time, and equivocation time to aid a client commit. The number of votes refers to a number of votes received for $B_k$ in view v as $q_{Bk}v$. As described herein, votes are broadcast by all replica devices 502 and the number of votes for a block can be greater than $q_r$. $q_{Bk}v$ can be updated each time the replica hears about a new vote in view v. The lock-time is locked as $B_{k-1}$ and recorded as t-lock$_{k-1,v}$ if $B_{k-1}$ is proposed in the same view v. The equivocation time is recorded as t-equiv$_{k,v}$ if the replica device 502 ever observes an equivocating block at height k in view v through a proposal or vote. The locked time t-lock$_{k-1,v}$ and equivocation time t-equiv$_{k-1,v}$ can be used by the client device 401 and the leader device 501 with synchrony assumptions to commit and the number of votes $q_B k,v$ can be used by the client device 401 and the leader device 501 with partial-synchrony assumptions to commit.

Various examples of the present disclosure recognize various commit rules for a client device. For example, the present disclosure provides a partially synchronous client commit rule and a synchronous client commit rule. As disclosed herein, the commit rules are provided for the client device but not the replica devices, because the replica devices do not commit a value in the present disclosure. Committing the value at the client device, rather than at a replica device, allows the flexible BFT protocol to support clients with different assumptions. Client devices in the Flexible BFT protocol learn the state of the protocol from the replica devices and based on their own assumptions determine whether a block has been committed.

In some examples, the client device, such as the leader device 501, can operate on a partially synchronous rule. In these examples, a block $B_k$ can be committed under the partially synchronous rule with parameter $q_c$ if and only if there exists l≥k and v such that C (B) and C (B) (v l+1) exist where $B_{l+1}$ extends B and B (if l=k, B=B) and $q_B l,v \geq q_c$ and $q_B l+1,v \geq q_c$. The leader device 501 deduces whether a block has been committed based on a number of votes received by a block. A block $B_l$ (together with its ancestors) is committed with parameter $q_c$ if $B_l$ and its immediate successor both receive ≥$q_c$ votes in the same view.

In these examples, a commitment based on $q_c$ votes is safe against <$q_c+q_r-1$ faulty replicas (Byzantine plus ABC faults). If $B_l$ gets $q_c$ votes in view v, due to flexible quorum intersection, a conflicting block cannot be certified in view v, unless ≥$q_c+q_r-1$ replicas are faulty. Moreover, $B_{l+1}$ extending $B_l$ has also received $q_c$ votes in view v. Thus, $q_c$ replicas lock block $B_l$ in view v. In subsequent views, honest replicas that have locked $B_l$ will only vote for a block that extends $B_l$ unless they unlock. However, due to flexible quorum intersection, they will not unlock unless $q_c+q_r$ 1 replicas are faulty.

In some examples, the client device, such as the leader device 501, can operate on a synchronous rule. In these examples, block $B_k$ is committed assuming Δ-synchrony if and only if the following holds for $q_r$ replicas. There exists l≥k and v (possibly different across replicas) such that C (B) exists where B extends B (if l=k, B=B) and an undisturbed-2Δ period is observed after $B_{l+1}$ is obtained. In other words, no equivocating block or votes at height l or view change of view v were observed before 2Δ time after $B_{l+1}$ was obtained. This can be described as min(current-time, t-equiv$_{l,v}$, t-viewchange$_v$)-t-locks$_{l,v} \geq 2\Delta$.

In these examples, a client device commitment of $B_k$ involves $q_r$ replicas collectively stating that a block $B_l$ extending $B_k$ encounters no bad event within sufficient time in a view. A bad event refers to either leader equivocation or view change, indicating sufficient replicas believe leader is faulty, and the sufficient time is $2\Delta$, where $\Delta$ is a synchrony bound chosen by the client. More formally, a replica states that a synchronous commit for block $B_k$ for a given parameter $\Delta$ set by a client is satisfied if and only if there exists $B_{l+1}$ that extends $B_l$ and $B_k$, and the replica observes an undisturbed-$2\Delta$ period after obtaining $B_{l+1}$, i.e., within $2\Delta$ time after $B_{l+1}$ was obtained, (i) no equivocating block is observed at height l, and (ii) no blame certificate/view change certificate for view v was obtained. As noted above, this can be described as min(current-time, t-equiv$_{l,v}$, t-viewchange$_v$-t-lock$_{l,v}$)$\geq 2\Delta$.

In these examples, the leader device 501 operating under the synchronous protocol assumes that all messages between replicas arrive within $\Delta$ time after they were sent. If the $\Delta$ chosen by the leader device 501 is a correct upper bound on message delay, then the commitment is safe against $q_r$ faulty replicas (Byzantine plus ABC faults), as explained in greater detail below. If less than $q_r$ replicas are faulty, at least one honest replica reported an undisturbed-$2\Delta$ period. This can be referred to as an honest replica h and the situation is analyzed from the honest replica h's perspective to explain why an undisturbed $2\Delta$ period ensures safety. As described herein, replicas in the flexible BFT protocol forward the proposal when voting. If $\Delta$-synchrony holds, every other honest replica h learns about the proposal $B_l$ at most $\Delta$ time after h learns about it. If any honest replica h voted for a conflicting block or quit view v, the honest replica h would have known within $2\Delta$ time.

Various examples of the present disclosure provide different mechanisms of committing the value, or blocks, to aid the safety and liveness proofs. In particular, examples of the present disclosure provide a direct commit and an indirect commit to aid the proofs. For example, a block can be committed directly by a client device with partial-synchrony assumptions if the block and its immediate successor both get $q_c$ votes in the same view and committed directly by a client device with synchrony assumptions if an honest replica reports an undisturbed-$2\Delta$ period after its successor block was obtained. A block can be committed indirectly by a client device with partial-synchrony assumptions if neither condition applies but the block is committed as a result of a block extending it by being committed directly. In these examples, the direct commit notion is a proof technique, particularly for client devices with synchrony assumptions. The client device with synchrony assumptions can sometimes not tell whether a replica is honest and, therefore, has no way of knowing whether or not a block is directly committed under the synchrony assumption.

Accordingly, examples of the present disclosure consider various theorems, or lemmas, regarding client commitments for safety and liveness. First, the present disclosure considers that when a client device directly commits a block $B_l$ in view v using a correct commit rule, then there does not exist Cqr (B) where v$\geq$v and $B_l \rightarrow B_r$. For this consideration, the two commit rules are considered separately. For client devices with partial-synchrony assumptions, for the parameter $q_c$ to be correct, the flexible quorum intersection must hold. In other words, the fraction of faulty replicas must be less than $q_c+q_r-1$. $B_l$ being directly committed under partial-synchrony assumptions with parameter $q_c$ implies that there are $q_c$ votes in view v for $B_l$ and $B_{l+1}$ where $B_{l+1}$ extends $B_l$. A conflicting certificate for Bl=$B_l$ cannot exist in views v. For example, a conflicting certificate cannot exist in view v, because otherwise $q_c+q_r$ 1 replicas must vote for both blocks in view v. Furthermore, if no conflicting certificate exists from view v to view v$\geq$v, then no conflicting certificate can come into existence in view v+1. As described herein, $q_c$ replicas voted for $B_{l+1}$ n view v, so $q_c$ replicas lock $B_l$ by the end of view v. If there is no conflicting certificate from view v to view v$\geq$v, then these $q_c$ replicas still lock $B_l$ by the end of view v. Since the total fraction of faults is less than $q_c+q_r$, the status shown by the leader of view v includes $q_r$ ($B_l$) and no higher conflicting certificate. Therefore, the only height-l block that can gather honest votes in view v+1 is $B_l$ and no conflicting certificate can come into existence in view v+1.

For client devices with synchrony assumptions, for synchrony bound $\Delta$ to be correct, $\Delta$ is an upper bound on worst case message delay and the fraction of faulty replicas is less than $q_r$. $B_l$ being directly committed under synchrony assumptions with $\Delta$-synchrony implies that at least one honest replica voted for $B_{l+1}$ extending $B_l$ in view v, and did not hear an equivocating block or view change within $2\Delta$ time after that. This replica can be referred to as h. Suppose replica h voted for $B_{l+1}$ extending $B_l$ in view v at time t and did not hear an equivocating block or view change by time t+$2\Delta$. A conflicting certificate for Bl=$B_l$ cannot exist in views $\geq$v. A conflicting certificate cannot exist in view v. No honest replica voted for Bl before time t+$\Delta$, because otherwise h would have received it by time t+$2\Delta$ would not have reported Bi as being committed. No honest replica would vote for Bl at time $\geq$t+$\Delta$ either, because by then they would have received $B_l$ from h. Therefore, Bl cannot obtain $q_r$ votes in view v. Furthermore, because h did not receive view change by time t+$2\Delta$, all honest replicas are still in view v by time t+$\Delta$, which means they all receive $B_{l+1}$ from h and lock $B_l$ by the end of view v.

Second, the present disclosure considers that two clients with correct commit rules commit the same block $B_k$ for each height k. If two distinct blocks $B_k$ and Bk are committed at height k, $B_k$ can be committed as a result of $B_l$ being directly committed in view v and Bk is committed as a result of Bl being directly committed in view v. In other words, $B_l$=$B_k$ if l=k and $B_l$ extends $B_k$ if l>k. Similarly, Bl=Bk if l=k and $B_l$ extends $B_k$ if l>k. Without loss of generality, it can be assumed that v$\leq$v. By the first theorem discussed above, any certificate in views$\geq$v (including view v) must extend $B_l$. Thus, l$\geq$1, and either Bl=$B_l$ (if l=l) or Bl extends $B_l$ (if l>l). In both cases, Bk=$B_k$.

Third, the present disclosure considers that if all client devices have correct commit rules, they continue committing new blocks. As described herein, by the definition of ABC faults, if the ABC fault cannot violate safety it will preserve liveness. As further described herein, if all client devices have correct commit rules, safety can be ensured even if ABC replicas behave arbitrarily. Therefore, once safety has been proved, ABC replicas can be treated as honest in terms of proving liveness. For example, a client commit rule can tolerate at most 1−$q_r$. Byzantine faults. If a Byzantine leader prevents liveness, there will be $q_r$ blame messages against it, and a view change will ensue to replace the leader as described in operation 550. Eventually, a non-Byzantine (honest or alive-but-corrupt) replica becomes the leader and drives consensus in new heights. If replicas use increasing timeouts, eventually, all non-Byzantine replicas stay in the same view for sufficiently long. When both conditions occur, if a client device's commit rule is correct, whether assuming synchrony or partial-synchrony, due to quorum availability, the client device will receive enough votes in the same view to commit.

In some examples, client devices with a synchrony assumption incur a latency of $2\Delta$ plus a few network speed rounds. In terms of the maximum network delay $\Delta$, this latency matches the other state-of-the-art synchronous protocols. However, the distinction is that Δ now depends on the client assumption and therefore different client devices may commit with different latencies Clients with partial-synchrony assumptions incur a latency of two rounds of voting, which matches a practical BFT. Every vote and new-view messages are broadcast to all replica devices, incurring $O(n^2)$ communication messages.

As described herein, three parameters, $q_r$, $q_c$, and Δ, determine the flexible BFT protocol. $q_r$ is the only parameter for the replicas and is picked by a service administrator. The choice of $q_r$ determines a set of client assumptions that can be supported. $q_c$ and Δ are chosen by clients to commit blocks. Various client assumptions can be supported by a given $q_r$.

Figure 6A:
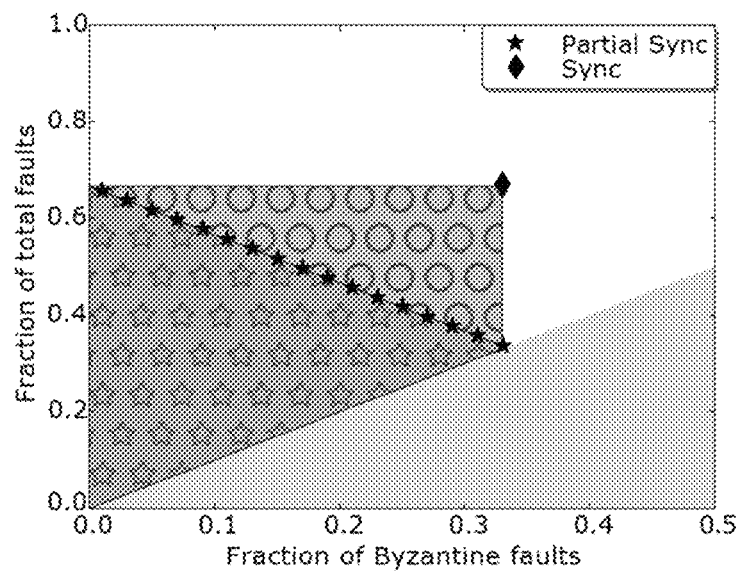
FIG. 6A illustrates a graph representing clients supported for $q_r = 2/3$ according to various examples of the present disclosure.

For example, FIG. 6A illustrates a graph representing clients supported for $q_r=\frac{2}{3}$ according to various examples of the present disclosure. As shown in FIG. 6A, the x-axis represents Byzantine faults and the y-axis represents total faults, which is Byzantine faults plus ABC faults. Each point in FIG. 6A represents a client fault assumption as a pair, represented by (Byzantine faults, total faults). The shaded gray area indicates an invalid area since we fewer total faults than Byzantine replicas is impossible. A missing dimension in this figure is the choice of Δ. Thus, the synchrony guarantee shown in this figure is for clients that choose a correct synchrony bound.

Client devices with partial-synchrony assumptions can get fault tolerance on or below the starred line. The right most point on the line is ($\frac{1}{3}$, $\frac{1}{3}$). In other words, less than a third of Byzantine replicas are tolerated and no additional ABC replicas are tolerated. This is the setting of existing partially synchronous consensus protocols. The flexible BFT protocol generalizes these protocols by giving client devices the option of moving up-left along the line. For example, client devices can tolerate fewer Byzantine faults and more total faults. By choosing $q_c > q_r$, a client tolerates $<q_c+q_r$ 1 total faults for safety and 1 $q_c$ Byzantine faults for liveness. In other words, as a client moves left, for every additional vote required, it tolerates one fewer Byzantine fault and one more total fault. For example, two more ABC faults. The left most point on this line, shown at (0, $\frac{2}{3}$), tolerates no Byzantine replicas and the highest fraction of ABC replicas. Client devices operating under the synchrony assumption, if the Δ assumption is correct, enjoy $\frac{1}{3}$ Byzantine tolerance and $\frac{2}{3}$ total tolerance represented by the diamond because synchronous commit rules are not parameterized by the number of votes received.

As shown in FIG. 6A, the starred portion represents fault tolerance provided by the partially synchronous commit rule. Specifically, setting $q_c$ to the total fault fraction yields the necessary commit rule. On the other hand, if a client device's required fault tolerance lies in the circled portion of the plot, then the synchronous commit rule with an appropriate Δ picked by the client device yields the necessary commit rule. Finally, if a client's target fault tolerance corresponds to the white region of the plot, then it is not achievable with the particular $q_r$.

In examples where a client device has an incorrect assumption with respect to the fault threshold or synchrony parameter Δ, then it can lose safety or liveness. If a client device believing in synchrony picks too small a Δ and commits a value b, it is possible that a conflicting value b' may also be certified. Replica devices may choose to extend the branch containing b', effectively reverting b and causing a safety violation. When a client device detects such a safety violation, the client device may revert some of its commits and increase the Δ to recover.

In examples where a client device with partial-synchrony assumption loses safety, the client device can update its fault model to move left along the starred line, i.e., tolerate higher total faults but fewer Byzantine faults. On the other hand, if the client device observes no progress as its threshold $q_c$ is not met, then the client device moves towards the right. However, if the true fault model is in the circled region, then the client device cannot find a partially synchronous commit rule that is both safe and live and eventually switches to using a synchronous commit rule.

As described herein, the goal of an ABC replica is to attack safety. Therefore, client devices with incorrect assumptions may be exploited by ABC replicas for their own gain, such as for double-spending. When a client device updates to a correct assumption and recovers from unsafe commits, their subsequent commits would be safe and final.

Figure 6B:
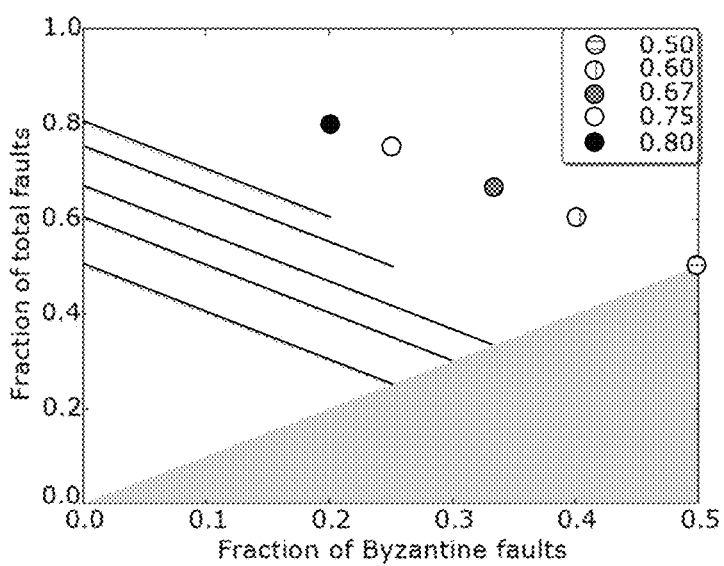
FIG. 6B illustrates a graph showing the trade-offs in terms of clients supported by different $q_r$ values in Flexible BFT according to various examples of the present disclosure.

The value $q_r$ can be selected by the service administrator in order to tolerate a large number of Byzantine faults and ABC faults. The larger number of tolerated faults are shown towards the top and/or right of FIG. 6A. FIG. 6B illustrates a graph showing the trade-offs in terms of clients supported by different $q_r$ values in Flexible BFT according to various examples of the present disclosure.

As shown in FIG. 6B, for clients with partial-synchrony assumptions, $q_r \geq \frac{2}{3}$ dominates $q_r < \frac{2}{3}$. For example, the fraction of Byzantine replicas (B) are bounded by $B < q_c + q_r - 1$ and $B \leq 1 - q_c$, so $B \leq q_r/2$. Therefore, as $q_r$ decreases, Byzantine fault tolerance decreases. Moreover, because the total fault tolerance is $q_c + q_r - 1$, a lower $q_r$ also tolerates a smaller fraction of total faults for a fixed $q_c$. For $q_r \geq \frac{2}{3}$ or for client devices believing in synchrony, no value of $q_r$ is Pareto optimal. For client devices with partial-synchrony assumptions, as $q_r$ increases, the total fault tolerance for safety increases. But because $q_c \geq q_r$, $B \leq 1 - q_r$, and therefore the Byzantine tolerance for liveness decreases. For client devices believing in synchrony, the total fault tolerance for safety is $<q_r$ and the Byzantine fault tolerance for liveness is $\geq 1 - q_r$. In both cases, the choice of $q_r$ represents a safety-liveness trade-off.

Accordingly, the flexible BFT protocol supports heterogeneous clients with different assumptions to co-exist and use the same ledger. The flexible BFT protocol allows the clients to tolerate combined Byzantine plus ABC faults exceeding ½ and ⅓ for synchrony and partial synchrony, respectively. At a technical level, a synchronous protocol where the replicas execute a network speed protocol and only the commit rule uses the synchrony assumption. For partial synchrony, Flexible Byzantine Quorums can deconstruct existing BFT protocols to understand the role played by the different quorums. These two protocols are combined to form the flexible BFT protocol.

Additional Examples

In one example, a method for performing a flexible byzantine fault tolerance (BFT) protocol for a consensus includes sending, from a client device, a proposed value to a plurality of replica devices and receiving, from at least one of the plurality of replica devices, a safe vote on the proposed value. The at least one of the plurality of replica devices determines to send the safe vote based on a first quorum being reached and the safe vote is sent to the client device and each of the other replica devices of the plurality of replica devices. The method further includes determining that a number of received safe votes, received from the at least one of the replica devices, for the proposed value meets or exceeds a second quorum threshold, selecting the proposed value based on the determination, and setting a period of time within which to receive additional votes from at least one of the plurality of replica devices. The period of time is a network delay bound for a single view of a BFT protocol. The method further includes, based on the period of time elapsing without receiving the additional votes, committing the selected value for the single view of the BFT protocol.

In another example, a system configured to perform a flexible byzantine fault tolerant (BFT) protocol for a consensus includes a client device and a plurality of replica devices. The client device includes a transceiver configured to transmit and receive signals and a processor configured to control the transceiver to send, to a plurality of replica devices, a proposed value. Each of the plurality of replica devices includes a transceiver configured to receive the proposed value from the client device and a processor configured to determine to send a safe vote based on a first quorum threshold being reached. The transceiver of the replica device is further configured to transmit the safe vote to the client device and each of the other plurality of replica devices. The processor of the client device is further configured to determine that a number of received safe votes, received from at least one of the replica devices, for the proposed value meets or exceeds a second quorum threshold, select the proposed value based on the determination, set a period of time within which to receive additional votes from at least one of the plurality of replica devices, wherein the period of time is a network delay bound for a single view of the BFT protocol, and based on the period of time elapsing without receiving the additional votes, commit the selected value for the single view of the BFT protocol.

In yet another example, a non-transitory computer storage medium stores instructions executable by a first computer system at a first site that, when executed by a processor of the first computer system, cause the processor to send, from a client device, a proposed value to a plurality of replica devices, receive, from at least one of the plurality of replica devices, a safe vote on the proposed value, wherein the at least one of the plurality of replica devices determines to send the safe vote based on a first quorum being reached and the safe vote is sent to the client device and each of the other replica devices of the plurality of replica devices, determine that a number of received safe votes, received from the at least one of the replica devices, for the proposed value meets or exceeds a second quorum threshold, select the proposed value based on the determination, set a period of time within which to receive additional votes from at least one of the plurality of replica devices, wherein the period of time is a network delay bound for a single view of a BFT protocol, and based on the period of time elapsing without receiving the additional votes, commit the selected value for the single view of the BFT protocol.

Alternatively, or in addition to the other examples described herein, examples include any combination of the following:
- at least one of the plurality of replica devices receives an equivocating vote on the proposed value from the client device and/or at least one of the plurality of replica devices, wherein the equivocating vote comprises the safe vote and at least one not-safe vote;
- receiving a blame message from the at least one of the plurality of replica devices, the blame message transmitted from the at least one of the plurality of replica devices based on receiving the equivocating vote;
- the client device is a leader device;
- based on a quantity of the blame messages meeting or exceeding a third quorum threshold, the client device is replaced as the leader device by one of the plurality of replica devices and the set period of time is adjusted;
- transitioning to a second view based on the replacement of the leader device'
- the second quorum threshold is variable;
- setting the second quorum threshold based on varying levels of a safety tolerance and a liveness tolerance of the client device;
- the replacement leader device changes the second quorum threshold in the second view;
- the setting the period of time comprises setting the period at time=$2\Delta$, where $\Delta$ represents a maximum network delay and only the client device is informed of the value of $2\Delta$;
- the value is committed based on a not-safe vote not being received within the period of time without synchrony among the plurality of replica devices;
- the locking of the proposed value comprises pre-determining the safe vote for the proposed value in a later period of time;
- unlocking the proposed value based on detecting at least one of the plurality of replica devices has not locked the proposed value;
- a first replica device of the plurality of replica devices executes a first protocol with a first delay bound;
- a second replica device of the plurality of replica devices executes a second protocol with a second delay bound;
- the first delay bound is different than the second delay bound;
- only the client device knows both the first delay bound and the second delay bound;
- the first protocol with the first delay bound is executed simultaneously with the second delay bound;
- the safe vote indicates an agreement with the proposed value; and
- the proposed value is a block of client commands.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Although the present disclosure has been described with reference to various examples, various changes and modifications can be made without departing from the scope of the present disclosure.

What is claimed is:

1. A computerized method for performing a flexible byzantine fault tolerant (BFT) protocol by a replica device, the method comprising:
    receiving, from a client device, a first proposed value;
    collecting, from other replica devices, one or more votes on the first proposed value in a first view;
    observing an equivocating vote indicating an equivocating value;
    broadcasting a blame message and the equivocating value to the client device and the other replica devices;
    collecting one or more blame messages from one or more of the other replica devices,
    forwarding the collected one or more blame messages to the other replica devices and the client device; and
    entering a second view.

2. The computerized method of claim 1, wherein each of the one or more votes comprises one of a safe vote or a non-safe vote on the first proposed value.

3. The computerized method of claim 1, wherein the replica device executes a first protocol with a first delay bound and a second replica device of the other replica devices executes a second protocol with a second delay bound.

4. The computerized method of claim 3, wherein only the client device knows both the first delay bound and the second delay bound.

5. The computerized method of claim 1, further comprising:
    locking on the first proposed value in the first view; and
    until the first proposed value is locked, voting only on the first proposed value in the second view.

6. The computerized method of claim 1, wherein the client device commits the first proposed value upon collecting unique votes on the first proposed value meeting or exceeding a commit threshold.

7. The computerized method of claim 6, wherein the commit threshold chosen by the client device is larger when an adversary is likely to break safety than the commit threshold chosen by the client device when the adversary is likely to attack liveness.

8. A system configured to perform a flexible byzantine fault tolerant (BFT) protocol by a replica device, the system comprising:
    a transceiver configured to receive, from a client device, a first proposed value; and
    a processor configured to:
        collect, from other replica devices, one or more votes on the first proposed value in a first view;
        observe an equivocating vote indicating an equivocating value;
        broadcast a blame message and the equivocating value to the client device and the other replica devices;
        collect one or more blame messages from one or more of the other replica devices,
        forward the collected one or more blame messages to the other replica devices and the client device; and
        enter a second view.

9. The system of claim 8, wherein each of the one or more votes comprises one of a safe vote or a non-safe vote on the first proposed value.

10. The system of claim 8, wherein the replica device executes a first protocol with a first delay bound and a second replica device of the other replica devices executes a second protocol with a second delay bound.

11. The system of claim 10, wherein only the client device knows both the first delay bound and the second delay bound.

12. The system of claim 8, wherein the processor is further configured to:
    lock on the first proposed value in the first view; and
    until the first proposed value is locked, vote only on the first proposed value in the second view.

13. The system of claim 8, wherein the client device commits the first proposed value upon collecting unique votes on the first proposed value meeting or exceeding a commit threshold.

14. The system of claim 13, wherein the commit threshold chosen by the client device is larger when an adversary is likely to break safety than the commit threshold chosen by the client device when the adversary is likely to attack liveness.

15. A non-transitory computer storage medium storing instructions executable by a computer system of a replica device, the instructions when executed by a processor of the computer system, cause the processor to:
    receive, from a client device, a first proposed value;
    collect, from other replica devices, one or more votes on the first proposed value in a first view;
    observe an equivocating vote indicating an equivocating value;
    broadcast a blame message and the equivocating value to the client device and the other replica devices;
    collect one or more blame messages from one or more of the other replica devices,
    forward the collected one or more blame messages to the other replica devices and the client device; and
    enter a second view.

16. The non-transitory computer storage medium of claim 15, wherein each of the one or more votes comprises one of a safe vote or a non-safe vote on the first proposed value.

17. The non-transitory computer storage medium of claim 15, wherein the replica device executes a first protocol with a first delay bound and a second replica device of the other replica devices executes a second protocol with a second delay bound.

18. The non-transitory computer storage medium of claim 17, wherein only the client device knows both the first delay bound and the second delay bound.

19. The non-transitory computer storage medium of claim 15, wherein the client device commits the first proposed value upon collecting unique votes on the first proposed value meeting or exceeding a commit threshold.

20. The non-transitory computer storage medium of claim 19, wherein the commit threshold chosen by the client device is larger when an adversary is likely to break safety than the commit threshold chosen by the client device when the adversary is likely to attack liveness.

* * * * *